(12) United States Patent
Okuda et al.

(10) Patent No.: US 8,997,469 B2
(45) Date of Patent: Apr. 7, 2015

(54) ENGINE WITH EXHAUST TREATMENT DEVICE AND ATTACHMENT METHOD FOR EXHAUST TREATMENT DEVICE

(75) Inventors: Mitsugu Okuda, Sakai (JP); Kozo Yoshida, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 48 days.

(21) Appl. No.: 13/820,775

(22) PCT Filed: Sep. 2, 2011

(86) PCT No.: PCT/JP2011/070016
§ 371 (c)(1),
(2), (4) Date: Mar. 5, 2013

(87) PCT Pub. No.: WO2012/035995
PCT Pub. Date: Mar. 22, 2012

(65) Prior Publication Data
US 2013/0160428 A1    Jun. 27, 2013

(30) Foreign Application Priority Data

Sep. 15, 2010    (JP) ................. 2010-207036

(51) Int. Cl.
| | |
|---|---|
| *F01N 3/02* | (2006.01) |
| *F01N 3/10* | (2006.01) |
| *B23Q 17/00* | (2006.01) |
| *B21D 51/16* | (2006.01) |
| *B23P 17/00* | (2006.01) |
| *F01N 13/18* | (2010.01) |
| *B60K 13/04* | (2006.01) |

(52) U.S. Cl.
CPC ......... *F01N 13/1805* (2013.01); *F01N 2340/00* (2013.01); *F01N 2590/08* (2013.01); *F01N 13/1822* (2013.01); *B60K 13/04* (2013.01)

(58) Field of Classification Search
CPC . F01N 13/18; F01N 13/1805; F01N 13/1822; F01N 2340/04; F01N 2590/08
USPC .............. 60/297, 299, 311; 29/407.09, 407.1, 29/426.1, 890.08
See application file for complete search history.

(56) References Cited

U.S. PATENT DOCUMENTS

| | | |
|---|---|---|
| 2011/0120085 A1 | 5/2011 | Saito et al. |
| 2012/0311984 A1 | 12/2012 | Mitsuda |

FOREIGN PATENT DOCUMENTS

| | | |
|---|---|---|
| JP | 2010-071175 A | 4/2010 |
| JP | 2010-138832 A | 6/2010 |
| WO | 2010032647 A1 | 3/2010 |
| WO | 2010055717 A1 | 5/2010 |
| WO | 2011114857 A1 | 9/2011 |

OTHER PUBLICATIONS

Int'l Search Report issued Nov. 29, 2011 in Int'l Application No. PCT/JP2011/070016.

*Primary Examiner* — Audrey K Bradley
(74) *Attorney, Agent, or Firm* — Panitch Schwarze Belisario & Nadel LLP

(57) ABSTRACT

An engine with an exhaust treatment device (2) wherein a rotation moment of a side support stay (12) is generated by a load of a side portion (50) received by side support stay fastening tool (13) via an edge portion (21) of a cutout groove (20). As a result, a load of the side portion (50) of the exhaust treatment device (2) can be supported by the side support stay (12). A one-side temporary mount portions (22) is provided in a one-side support stay (10). The one-side support stay (10) can be temporarily mounted on the one-side temporary mount portions (22).

16 Claims, 9 Drawing Sheets

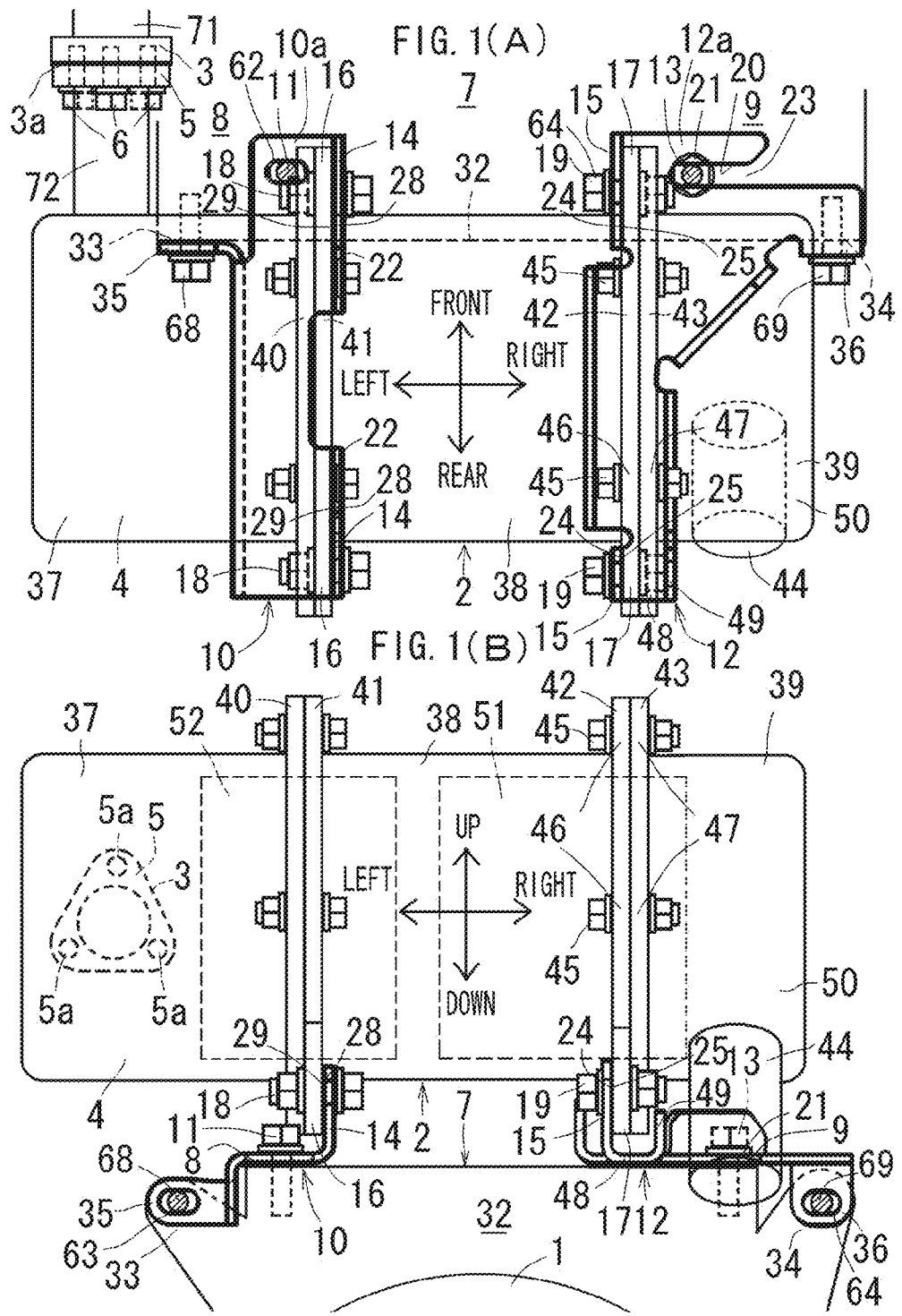

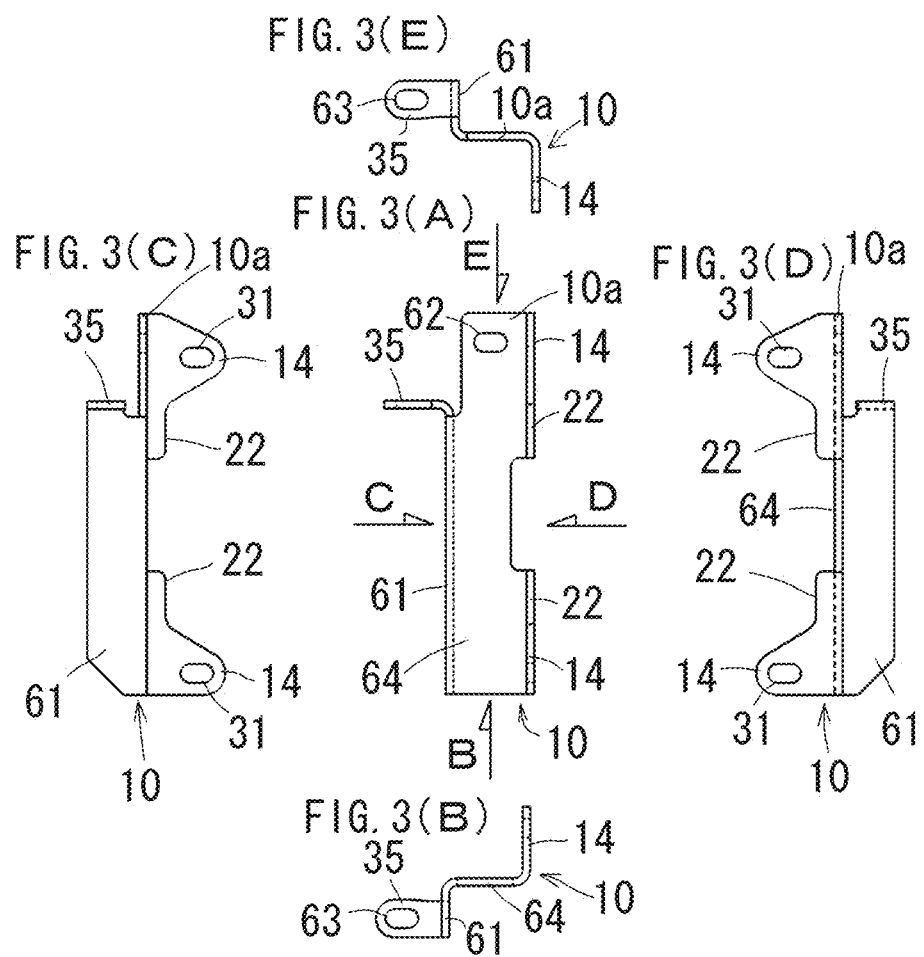

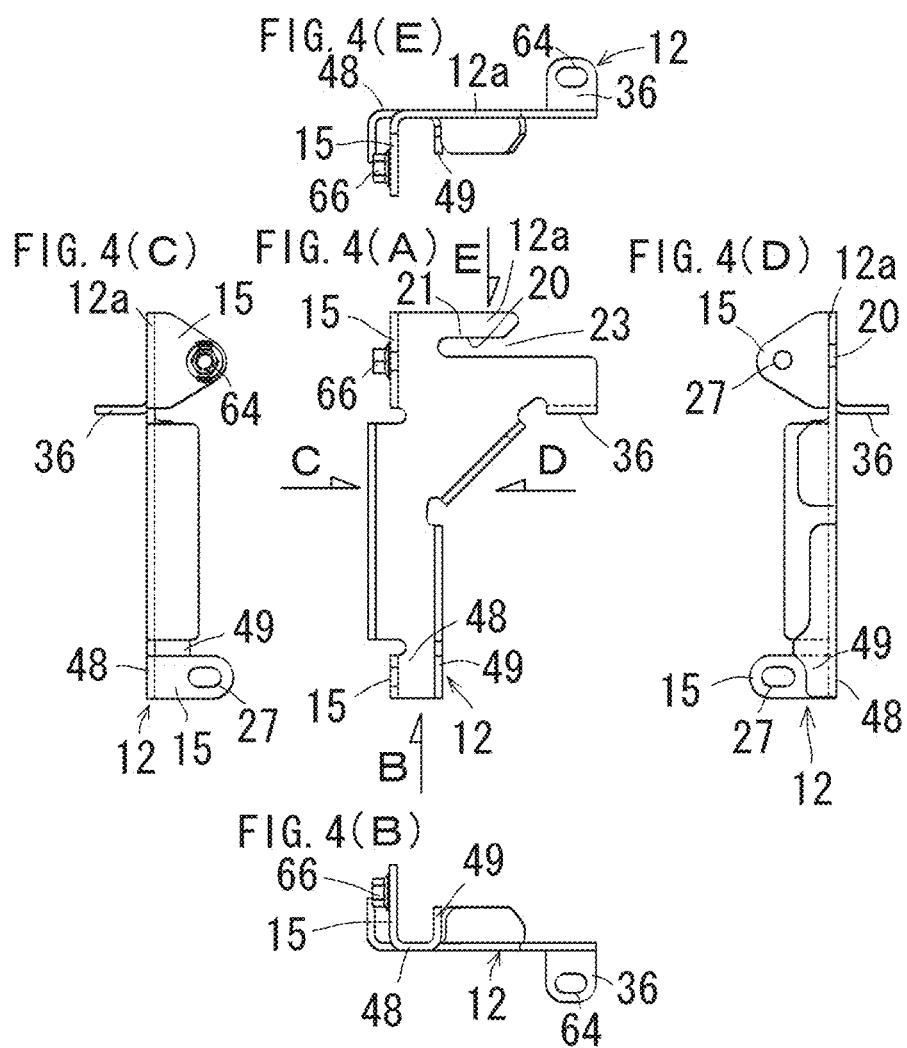

ENGINE WITH EXHAUST TREATMENT DEVICE AND ATTACHMENT METHOD FOR EXHAUST TREATMENT DEVICE

CROSS-REFERENCE TO RELATED APPLICATION

This application is a Section 371 of International Application No. PCT/JP2011/070016, filed Sep. 2, 2011, which was published in the Japanese language on Mar. 22, 2012, under International Publication No. WO 2012/035995 A1, and the disclosure of which is incorporated herein by reference.

The present invention relates to an engine with an exhaust treatment device and an attachment method for the exhaust treatment device, and in detail, relates to an engine with an exhaust treatment device with which an attachment task of the exhaust treatment device to an engine rear upper portion becomes simplified and an attachment method for the exhaust treatment device.

BACKGROUND ART

Conventionally, as an engine with an exhaust treatment device, there is an engine with an exhaust treatment device, wherein the installing direction of a crankshaft is the front and rear direction, a flywheel is placed on the rear side, and the width direction of the engine is the lateral direction, a sideways exhaust treatment device is arranged on the rear upper side of the engine, an engine exhaust outlet flange is arranged on a one side of the engine, an exhaust inlet flange is arranged in a one-side portion of the exhaust treatment device, the exhaust inlet flange is attached to the engine exhaust outlet flange by exhaust flange fastening tools, a one-side support stay mount surface and an other-side support stay mount surface are provided in an engine rear upper portion, a front portion of a one-side support stay is mounted on the one-side support stay mount surface and attached by a one-side support stay fastening tool, and a front portion of an other-side support stay is mounted on the other-side support stay mount surface and attached by an other-side support stay fastening tool, so that the exhaust treatment device is supported on the engine rear upper portion via the one-side support stay and the other-side support stay (for example, refer to Patent Document 1).

According to this type of engine, there is an advantage that the exhaust treatment device can be compactly arranged in a dead space in the engine rear upper portion.

However, this conventional technique has a problem since both the one-side support stay and the other-side support stay are welded to the exhaust treatment device as described in of the specification of Patent Document 1.

PRIOR ART DOCUMENT

Patent Document

Patent Document 1: Japanese Patent Laid-open Publication No. 2010-71175 (refer to FIGS. 15, 16, 18)

SUMMARY OF THE INVENTION

Problems to be Solved by the Invention

<<Problem>> An attachment task of the exhaust treatment device to the engine rear upper portion becomes complicated.

In the above conventional technique, both the one-side support stay and the other-side support stay are welded to the exhaust device. Thus, during the attachment task of the exhaust treatment device to the engine rear upper portion, there is a need for always supporting the exhaust treatment device by an external support device such as a crane, so that the attachment task of the exhaust treatment device to the engine rear upper portion becomes complicated.

An object of the present invention is to provide an engine with an exhaust treatment device with which an attachment task of the exhaust treatment device to an engine rear upper portion becomes simplified and an attachment method for the exhaust treatment device.

Solutions to the Problems

A particular matter of the above-described invention is as follows.

An engine with an exhaust treatment device, wherein: as shown in FIGS. 1(A) and 1(B), the installing direction of a crankshaft is the front and rear direction, a flywheel (1) is placed on the rear side, and the width direction of the engine is the lateral direction; a sideways exhaust treatment device (2) is arranged on the rear upper side of the engine; an engine exhaust outlet flange (3) is arranged on a one side of the engine, an exhaust inlet flange (5) is arranged in a one-side portion (4) of the exhaust treatment device (2), and the exhaust inlet flange (5) is attached to the engine exhaust outlet flange (3) by exhaust flange fastening tools (6) (6) (6); and a one-side support stay mount surface (8) and an other-side support stay mount surface (9) are provided in an engine rear upper portion (7), a front portion (10a) of a one-side support stay (10) is mounted on the one-side support stay mount surface (8) and attached by a one-side support stay fastening tool (11), and a front portion (12a) of an other-side support stay (12) is mounted on the other-side support stay mount surface (9) and attached by an other-side support stay fastening tool (13), so that the exhaust treatment device (2) is supported on the engine rear upper portion (7) via the one-side support stay (10) and the other-side support stay (12), wherein: as shown in FIGS. 1(A) and 1(B), one-side support portions (14) (14) are provided in the one-side support stay (10), and other-side support portions (15) (15) are provided in the other-side support stay (12); one-side supported portions (16) (16) and other-side supported portions (17) (17) are provided in the exhaust treatment device (2); upon attaching the one-side supported portions (16) (16) of the exhaust treatment device (2) to the one-side support portions (14) (14) of the one-side support stay (10) by one-side supported portion fastening tools (18) (18), and attaching the other-side supported portions (17) (17) of the exhaust treatment device (2) to the other-side support portions (15) (15) of the other-side support stay (12) by other-side supported portion fastening tools (19) (19);

as shown in FIG. 1(A), by providing a cutout groove (20) having an opening (23) in one end in the front portion (12a) of the other-side support stay (12), and inserting the other-side support stay fastening tool (13) attached to the other-side support stay mount surface (9) into the cutout groove (20); in a case where the other-side support stay fastening tool (13) is brought into the cutout groove (20) from the opening (23) while guiding the front portion (12a) of the other-side support stay (12) by the other-side support stay mount surface (9), rotation moment of the other-side support stay (12) generated by a load of an other-side portion (50) of the exhaust treatment device (2) is received by the other-side support stay fastening tool (13) via an edge portion (21) of the cutout groove (20), so that the load of the other-side portion (50) of the exhaust treatment device (2) is capable of being supported by the other-side support stay (12); and as shown in FIG. 2(A), by providing one-side temporary mount portions (22) (22) in the one-side support stay (10); the one-side portion (4) of the exhaust treatment device (2) before being attached to the engine exhaust outlet flange (3) and the one-side support stay (10) are capable of being temporarily mounted on the one-side temporary mount portions (22) (22).

A particular matter of the above-described invention is as follows.

An attachment method for an exhaust treatment device for attaching the exhaust treatment device (2) of the engine with the above-described exhaust treatment device to the engine rear upper portion (7), wherein the method comprises the steps of as shown in FIGS. 1(A) and 1(B), mounting the front portion (10a) of the one-side support stay (10) onto the one-side support stay mount surface (8) and attaching by the one-side support stay fastening tool (11); attaching the other-side support stay fastening tool (13) to the other-side support stay mount surface (9); loosely attaching the other-side support portions (15) (15) of the other-side support stay (12) to the other-side supported portions (17) (17) of the exhaust treatment device (2) by the other-side supported portion fastening tools (19) (19), so as to oscillatably couple the other-side support stay (12) to the exhaust treatment device (2);

as shown in FIG. 1(A), by bringing the other-side support stay fastening tool (13) into the cutout groove (20) from the opening (23) while guiding the front portion (12a) of the other-side support stay (12) by the other-side support stay mount surface (9), receiving the rotation moment of the other-side support stay (12) generated by the load of the other-side portion (50) of the exhaust treatment device (2) by the other-side support stay fastening tool (13) via the edge portion (21) of the cutout groove (20) so as to support the load of the other-side portion (50) of the exhaust treatment device (2) by the other-side support stay (12);

lowering the one-side portion (4) of the exhaust treatment device (2) taking the other-side supported portion fastening tool (19) supported by the other-side support stay (12) shown in FIG. 1(B) as a supporting point so as to temporarily mount the one-side portion (4) of the exhaust treatment device (2) before being attached to the engine exhaust outlet flange (3) and the one-side support stay (10) onto the one-side temporary mount portions (22) (22); and lifting the one-side portion (4) of the exhaust treatment device (2) temporarily mounted on the one-side temporary mount portions (22) (22) shown in FIG. 2(A) taking the other-side supported portion fastening tool (19) supported by the other-side support stay (12) shown in FIG. 1(B) as a supporting point so as to attach the exhaust inlet flange (5) to the engine exhaust outlet flange (3) by the exhaust flange fastening tools (6) (6) (6) as shown in FIG. 1(A).

Effects of the Invention

The above-described invention exerts the following effect.
<<Effect>> An attachment task of the exhaust treatment device to the engine rear upper portion becomes simplified.

With the above-described invention, as shown in FIGS. 1(A) and 1(B), during the attachment task of the exhaust treatment device (2) to the engine rear upper portion (7), the load of the other-side portion (50) of the exhaust treatment device (2) can be supported by the other-side support stay (12) and the load of the one-side portion (4) of the exhaust treatment device (2) can be supported by the one-side support stay (10). Thus, there is no need for supporting the exhaust treatment device (2) by an external support device such as a crane, so that the attachment task of the exhaust treatment device (2) to the engine rear upper portion (7) becomes simplified.

<<Effect>> A support task of the other-side portion of the exhaust treatment device is simple.

With the above-described invention, as shown in FIG. 1(A), by bringing the other-side support stay fastening tool (13) into the cutout groove (20) from the opening (23) while guiding the front portion (12a) of the other-side support stay (12) by the other-side support stay mount surface (9), the load of the other-side portion (50) of the exhaust treatment device (2) can be supported by the other-side support stay (12). Thus, the support task of the other-side portion (50) of the exhaust treatment device (2) is simple.

The invention exerts the following effect in addition to the effect of the above-described invention.
<<Effect>> The other-side supported portion fastening tools can be prevented from being loosened by vibration of the engine.

With the above-described invention, as shown in FIGS. 1(A) and 1(B), for adjusting a lateral position of the other-side support stay (12), mating surfaces (24) (24) of the other-side support portions (15) (15) of the other-side support stay (12) can be overlapped with mating surfaces (25) (25) of the other-side supported portions (17) (17) of the exhaust treatment device (2) from the side, and the other-side supported portion fastening tools (19) (19) can be fastened while axes thereof are placed sideways. Thus, the other-side support portions (15) (15) and the other-side supported portions (17) (17) can be brought into a proper attachment posture where both the mating surfaces (24) (25) are closely attached, and these can be properly fastened by the other-side supported portion fastening tools (19) (19) from both the sides. Therefore, the other-side supported portion fastening tools (19) (19) can be prevented from being loosened by the vibration of the engine.

The invention exerts the following effect in addition to the effect of the above-described invention.
<<Effect>> A position setting task of the rear other-side supported portion fastening tool is simple.

With the above-described invention, as shown in FIGS. 1(A) and 1(B), the load of the one-side portion (4) of the exhaust treatment device (2) is supported by the exhaust flange fastening tool (6) positioned in the up and down direction and the lateral direction by attachment to the engine exhaust outlet flange (3), the load of the other-side portion (50) of the exhaust treatment device (2) is supported by the other-side support stay (12) via the front other-side supported portion fastening tool (19) whose up-down position is set at an overlapping position of a circular hole and a front-rear long hole on the front side, and the exhaust treatment device (2) is retained at a predetermined attachment posture positioned in the front and rear direction, the lateral direction, and the up and down direction. Thereby, as shown in FIG. 2(B), the rear other-side supported portion fastening tool (19) can be set at a crossing position of a front-rear long hole and an up-down long hole on the rear side. Thus, the position setting task of the rear other-side supported portion fastening tool (19) is simple.

The invention exerts the following effect in addition to the effect of the above-described invention.
<<Effect>> The one-side supported portion fastening tools can be prevented from being loosened by the vibration of the engine.

With the above-described invention, as shown in FIGS. 1(A) and 1(B), for adjusting a lateral position of the one-side support stay (10), mating surfaces (28) (28) of the one-side support portions (14) (14) of the one-side support stay (10) can be overlapped with mating surfaces (29) (29) of the one-side supported portions (16) (16) of the exhaust treatment device (2) from the side, and the one-side supported portion fastening tools (18) (18) can be fastened while axes thereof are placed sideways. Thus, the one-side support portions (14) (14) and the one-side supported portions (16) (16) can be brought into a proper attachment posture where both the mating surfaces (28) (29) are closely attached, and these can be properly fastened by the one-side supported portion fastening tools (18) (18) from both the sides. Therefore, the one-side supported portion fastening tools (18) (18) can be prevented from being loosened by the vibration of the engine.

The invention exerts the following effect in addition to the effect of the above-described invention.

<<Effect>> A position setting task of the pair of front and rear one-side supported portion fastening tools is simple.

With the above-described invention, as shown in FIG. 1(A), by overlapping the mating surfaces (28) (28) of the one-side support portions (14) (14) of the one-side support stay (10) whose front-rear position is set with the mating surfaces (29) (29) of the one-side supported portions (16) (16) of the exhaust treatment device (2) retained at a predetermined attachment posture from the side, as shown in FIG. 2(A), a crossing position of an up-down long hole and a front-rear long hole on the front side is set and a crossing position of an up-down long hole and a front-rear long hole on the rear side is set, and the pair of front and rear one-side supported portion fastening tools (18) (18) is inserted and attached to the set pair of front and rear crossing positions, so that the one-side supported portions (16) (16) can be fixed to the one-side support portions (14) (14). Thus, the position setting task of the pair of front and rear one-side supported portion fastening tools (18) (18) is simple.

The invention exerts the following effect in addition to the effect of the above-described invention.

<<Effect>> The exhaust treatment device is stably supported on the engine rear upper portion.

With the above-described invention, as shown in FIGS. 2(A) and 2(B), a part of the rotation moment of the other-side support stay (12) generated by the load of the other-side portion (50) of the exhaust treatment device (2) can be received by an other-side stay pressure receiving surface (34) of an engine rear surface (32) via an other-side support stay positioning piece (36), and a part of rotation moment of the one-side support stay (10) generated by the load of the one-side portion (4) of the exhaust treatment device (2) can be received by a one-side stay pressure receiving surface (33) of the engine rear surface (32) via a one-side support stay positioning piece (35). Thus, the exhaust treatment device (2) is stably supported on the engine rear upper portion (7) via the other-side support stay (12) and the one-side support stay (10).

The invention exerts the following effect in addition to the effect of the above-described invention.

<<Effect>> The exhaust treatment device is stably supported on the engine rear upper portion.

As shown in FIGS. 1(A) and 1(B) and 2(A) and 2(B), the one-side supported portions (16) (16) and the other-side supported portions (17) (17) of the exhaust treatment device (2) are extended from predetermined coupling flanges (41) (42). Thus, the exhaust treatment device (2) is stably supported on the engine rear upper portion (7) via the coupling flanges (41) (42) formed to be highly rigid.

The invention exerts the following effect in addition to the effect of the above-described invention.

<<Effect>> Maintenance in a DPF and a casing of the exhaust treatment device can be easily performed.

As shown in FIGS. 1(A) and 1(B), an exhaust inlet side casing part (37) and an exhaust outlet side casing part (39) are detachable from a DPF housing casing part (38). Thus, the maintenance in a DPF (51) and the casing of the exhaust treatment device (2) can be easily performed.

The invention exerts the following effect in addition to the effect of the above-described invention.

<<Effect>> The protruding direction of an exhaust outlet pipe applicable to a model in which the engine is mounted can be readily selected.

As shown in FIG. 2(B), by displacing the exhaust outlet side casing part (39) in the circumferential direction by the distant angle, matching fastened portions (47) (47) (47) (47) (47) (47) of a coupling flange (43) of the exhaust outlet side casing part (39) with fastened portions (46) (46) (46) (46) (46) (46) of the coupling flange (42) of the DPF housing casing part (38), and coupling the exhaust outlet side casing part (39) to the DPF housing casing part (38) by flange fastening tools (45) (45) (45) (45) (45) (45), the protruding direction of an exhaust outlet pipe (44) from an outer peripheral surface of the exhaust outlet side casing part (39) can be selected. Thus, the protruding direction of the exhaust outlet pipe (44) applicable to the model in which the engine is mounted can be freely selected.

The invention exerts the following effect in addition to the effect of the above-described invention.

<<Effect>> While enhancing rigidity of the other-side support stay in the vicinity of the other-side support portion by a reinforcing piece, contact between the reinforcing piece and the exhaust outlet pipe can be avoided.

As shown in FIG. 1(B), a reinforcing portion (49) facing the other-side support portion (15) is bent and formed upward from a laterally outer edge of a horizontal piece (48), and the reinforcing portion (49) is positioned on the laterally inner side of the exhaust outlet pipe (44) when seen from the rear side of the engine. Thus, while enhancing the rigidity of the other-side support stay (12) in the vicinity of the other-side support portion (15) by the reinforcing portion (49), the contact between the reinforcing portion (49) and the exhaust outlet pipe (44) can be avoided.

The invention exerts the following effect.

<<Effect>> The attachment task of the exhaust treatment device to the engine rear upper portion becomes simplified.

As shown in FIGS. 1(A) and 1(B), during the attachment task of the exhaust treatment device (2) to the engine rear upper portion (7), the load of the other-side portion (50) of the exhaust treatment device (2) is supported by the other-side support stay (12) and the load of the one-side portion (4) of the exhaust treatment device (2) is supported by the one-side support stay (10). Thus, there is no need for supporting the exhaust treatment device (2) by an external support device such as a crane, so that the attachment task of the exhaust treatment device (2) to the engine rear upper portion (7) becomes simplified.

<<Effect>> The support task of the other-side portion of the exhaust treatment device is simple.

As shown in FIG. 1(A), by bringing the other-side support stay fastening tool (13) into the cutout groove (20) from the opening (23) while guiding the front portion (12a) of the other-side support stay (12) by the other-side support stay mount surface (9), the load of the other-side portion (50) of the exhaust treatment device (2) is supported by the other-side support stay (12). Thus, the support task of the other-side portion (50) of the exhaust treatment device (2) is simple.

The invention exerts the following effect in addition to the effect of the above-described invention.

<<Effect>> The other-side supported portion fastening tools can be prevented from being loosened by the vibration of the engine.

As shown in FIGS. 1(A) and 1(B), for adjusting the lateral position of the other-side support, stay (12), the mating surfaces (24) (24) of the other-side support portions (15) (15) of the other-side support stay (12) are overlapped with the mating surfaces (25) (25) of the other-side supported portions (17) (17) of the exhaust treatment device (2) from the side, and the other-side supported portion fastening tools (19) (19) are attached while the axes thereof are placed sideways. Thus, the other-side support portions (15) (15) and the other-side supported portions (17) (17) can be brought into a proper attachment posture where both the mating surfaces (24) (25) are closely attached, and these can be properly fastened by the other-side supported portion fastening tools (19) (19) from both the sides. Therefore, the other-side supported portion fastening tools (19) (19) can be prevented from being loosened by the vibration of the engine.

The invention exerts the following effect in addition to the effect of then above-described invention.

<<Effect>> The position setting task of the rear other-side supported portion fastening tool is simple.

As shown in FIGS. 1(A) and 1(B), the load of the one-side portion (4) of the exhaust treatment device (2) is supported by the exhaust flange fastening tool (6) positioned in the up and down direction and the lateral direction by attachment to the engine exhaust outlet flange (3), the load of the other-side portion (50) of the exhaust treatment device (2) is supported by the other-side support stay (12) via the front other-side supported portion fastening tool (19) whose up-down position is set at the overlapping position of the circular hole and the front-rear long hole on the front side, and the exhaust treatment device (2) is retained at a predetermined attachment posture positioned in the front and rear direction, the lateral direction, and the up and down direction. Thereby, as shown in FIG. 2(B), the rear other-side supported portion fastening tool (19) is set at the crossing position of the front-rear long hole and the up-down long hole on the rear side. Thus, the position setting task of the rear other-side supported portion fastening tool (19) is simple.

The invention exerts the following effect in addition to the effect of the above-described invention.

<<Effect>> The one-side supported portion fastening tools can be prevented from being loosened by the vibration of the engine.

As shown in FIGS. 1(A) and 1(B), for adjusting the lateral position of the one-side support stay (10), the mating surfaces (28) (28) of the one-side support portions (14) (14) of the one-side support stay (10) are overlapped with the mating surfaces (29) (29) of the one-side supported portions (16) (16) of the exhaust treatment device (2) from the side, and the one-side supported portion fastening tools (18) (18) are attached while the axes thereof are placed sideways. Thus, the one-side support portions (14) (14) and the one-side supported portions (16) (16) can be brought into a proper attachment posture where both the mating surfaces (28) (29) are closely attached, and these can be properly fastened by the one-side supported portion fastening tools (18) (18) from both the sides. Therefore, the one-side supported portion fastening tools (18) (18) can be prevented from being loosened by the vibration of the engine.

The invention exerts the following effect in addition to the effect of the above-described invention.

<<Effect>> A position setting operation of the pair of front and rear one-side supported portion fastening tools is simple.

As shown in FIG. 1(A), by overlapping the mating surfaces (28) (28) of the one-side support portions (14) (14) of the one-side support stay (10) whose front-rear position is set with the mating surfaces (29) (29) of the one-side supported portions (16) (16) of the exhaust treatment device (2) retained at the predetermined attachment posture from the side, as shown in FIG. 2(A), the crossing position of the up-down long hole and the front-rear long hole on the front side is set and the crossing position of the up-down long hole and the front-rear long hole on the rear side is set, and the pair of front and rear one-side supported portion fastening tools (18) (18) is inserted and attached to the set pair of front and rear crossing positions, so that the one-side supported portions (16) (16) are fixed to the one-side support portions (14) (14). Thus, the position setting task of the pair of front and rear one-side supported portion fastening tools (18) (18) is simple.

The invention exerts the following effect in addition to the effect of the above-described invention.

<<Effect>> The exhaust treatment device is stably supported on the engine rear upper portion.

With the above-described invention, as shown in FIGS. 2(A) and 2(B), a part of the rotation moment of the other-side support stay (12) generated by the load of the other-side portion (50) of the exhaust treatment device (2) is received by the other-side stay pressure receiving surface (34) of the engine rear surface (32) via the other-side support stay positioning piece (36), and a part of the rotation moment of the one-side support stay (10) generated by the load of the one-side portion (4) of the exhaust treatment device (2) is received by the one-side stay pressure receiving surface (33) of the engine rear surface (32) via the one-side support stay positioning piece (35). Thus, the exhaust treatment device (2) is stably supported on the engine rear upper portion (7) via the other-side support stay (12) and the one-side support stay (10).

BRIEF DESCRIPTION OF THE DRAWINGS

FIG. 1(A) is a schematic plan view of an exhaust treatment device of a vertical engine with the exhaust treatment device according to Embodiment of the present invention and the vicinity thereof, and FIG. 1(B) is a schematic rear view.

FIG. 2(A) is a view in which FIG. 1(B) is seen from the left side, and FIG. 2(B) is a view in which FIG. 1(B) is seen from the right side.

FIG. 3(A) is a plan view of a first support stay used in the vertical engine with the exhaust treatment device according to Embodiment of the present invention, FIG. 3(B) is an arrow view of the B direction of FIG. 3(A), FIG. 3(C) is an arrow view of the C direction of FIG. 3(A), FIG. 3(D) is an arrow view of the D direction of FIG. 3(A), and FIG. 3(E) is an arrow view of the E direction of FIG. 3(A).

FIG. 4(A) is a plan view of a second support stay used in the vertical engine with the exhaust treatment device according to Embodiment of the present invention, FIG. 4(B) is an arrow view of the B direction of FIG. 4(A), FIG. 4(C) is an arrow view of the C direction of FIG. 4(A), FIG. 4(D) is an arrow view of the D direction of FIG. 4(A), and FIG. 4(E) is an arrow view of the E direction of FIG. 4(A).

EMBODIMENTS OF THE INVENTION

FIGS. 1 to 9 are views for illustrating an engine with an exhaust treatment device according to Embodiment of the present invention. In Embodiment, an in-line multicylinder vertical diesel engine with an exhaust treatment device in which a DPF (51) is housed will be described.

As shown in FIGS. 1(A) and 1(B), the installing direction of a crankshaft is the front and rear direction, a flywheel (1) is placed on the rear side, and the width direction of the engine is the lateral direction.

Figure 7:
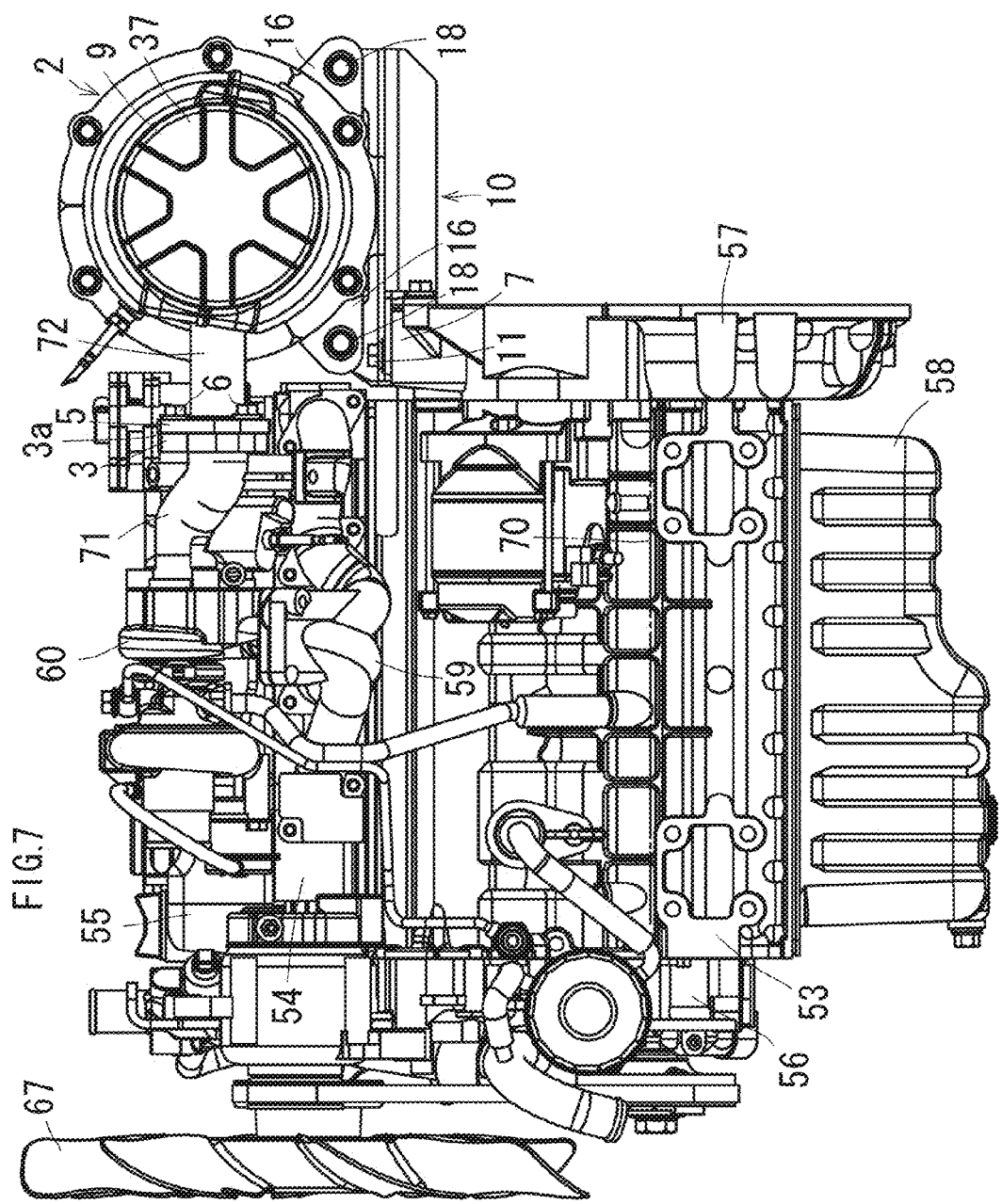
FIG. 7 is a one-side view of the engine of FIG. 5.
Figure 8:
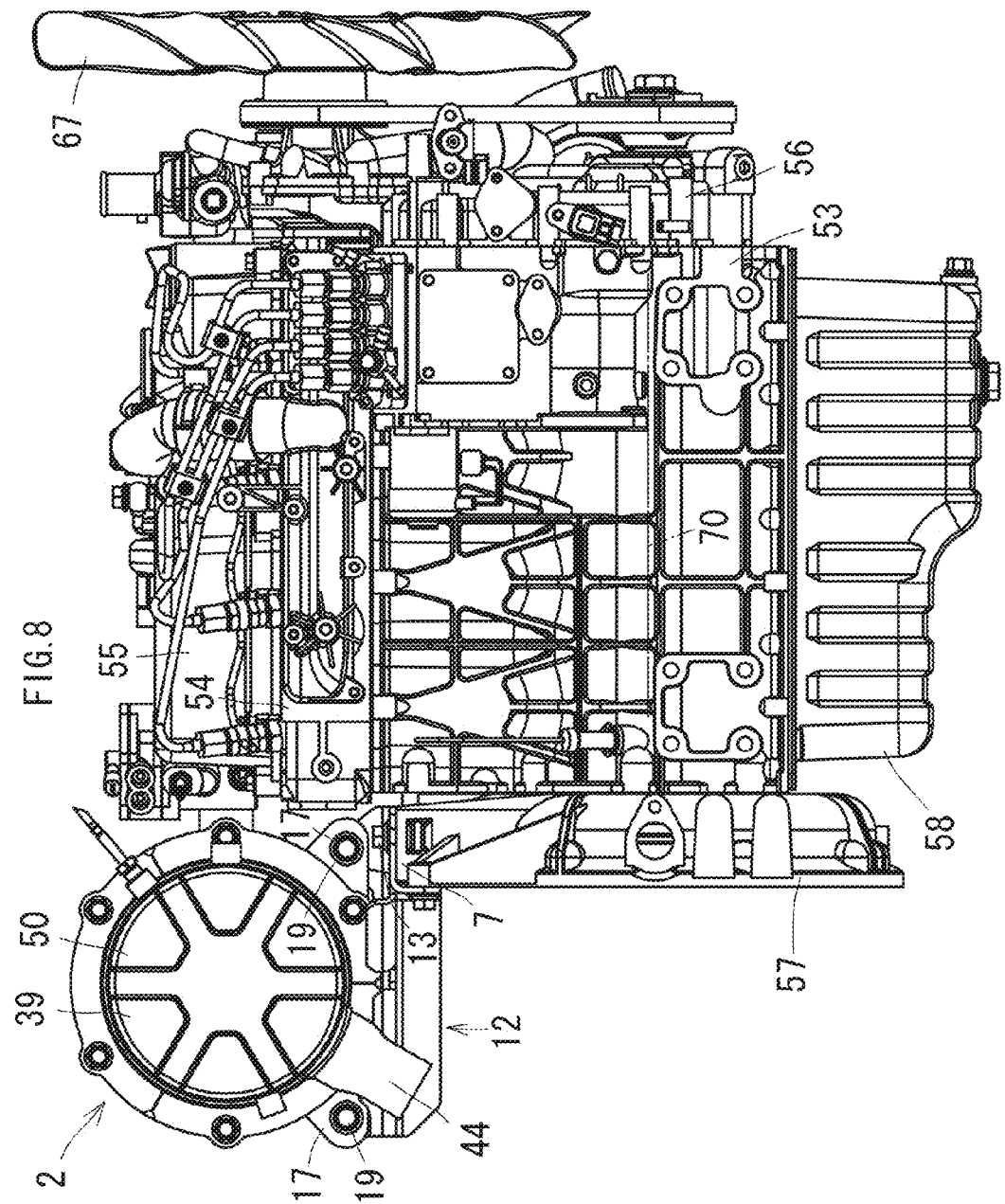
FIG. 8 is an other-side view of the engine of FIG. 5.
Figure 9:
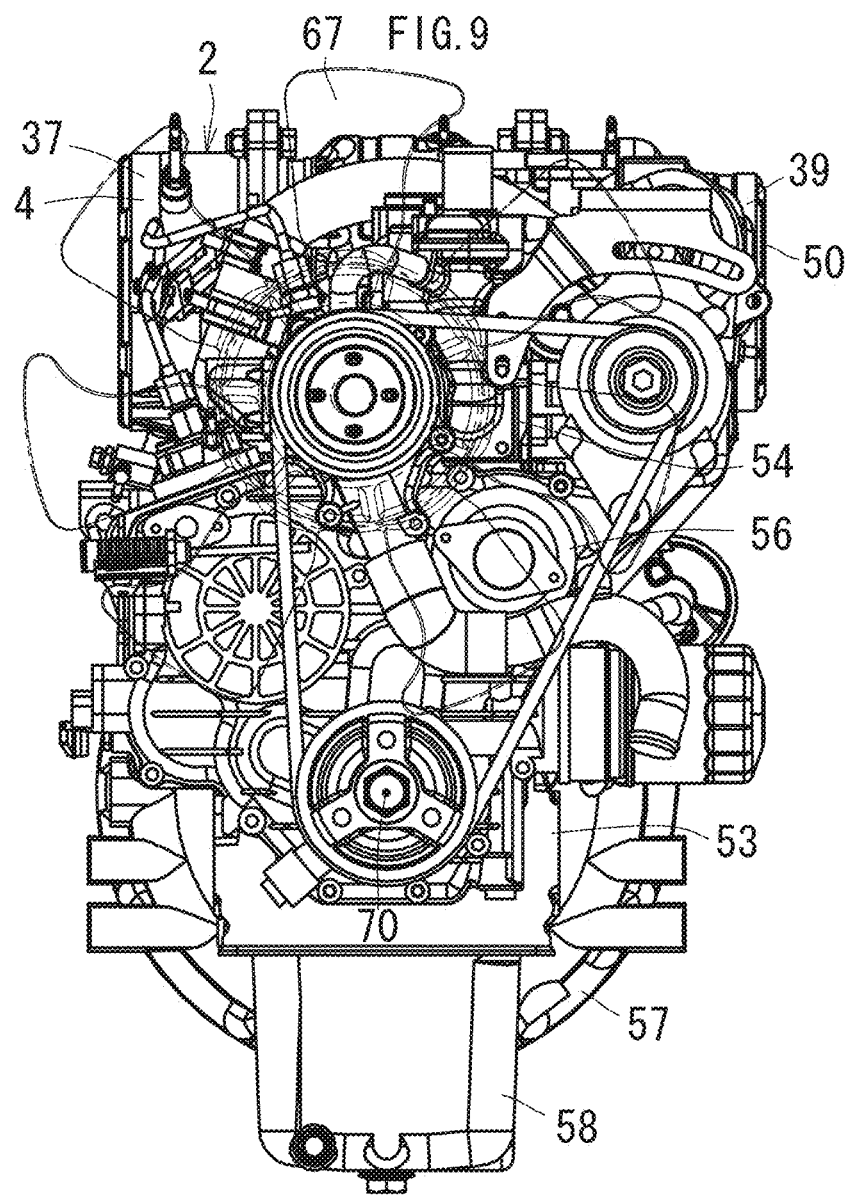
FIG. 9 is a front view of the engine of FIG. 5.

As shown in FIG. 7, a cylinder head (54) in an upper part of a cylinder block (53) is assembled, a head cover (55) is assembled to an upper part of the cylinder head (54), a gear case (56) is assembled to a front part of the cylinder block (53), an engine cooling fan (67) is arranged on the front side of the gear case (56), a flywheel housing (57) is assembled to a rear part of the cylinder block (53), and an oil pan (58) is assembled to a lower part of the cylinder block (53).

Figure 6:
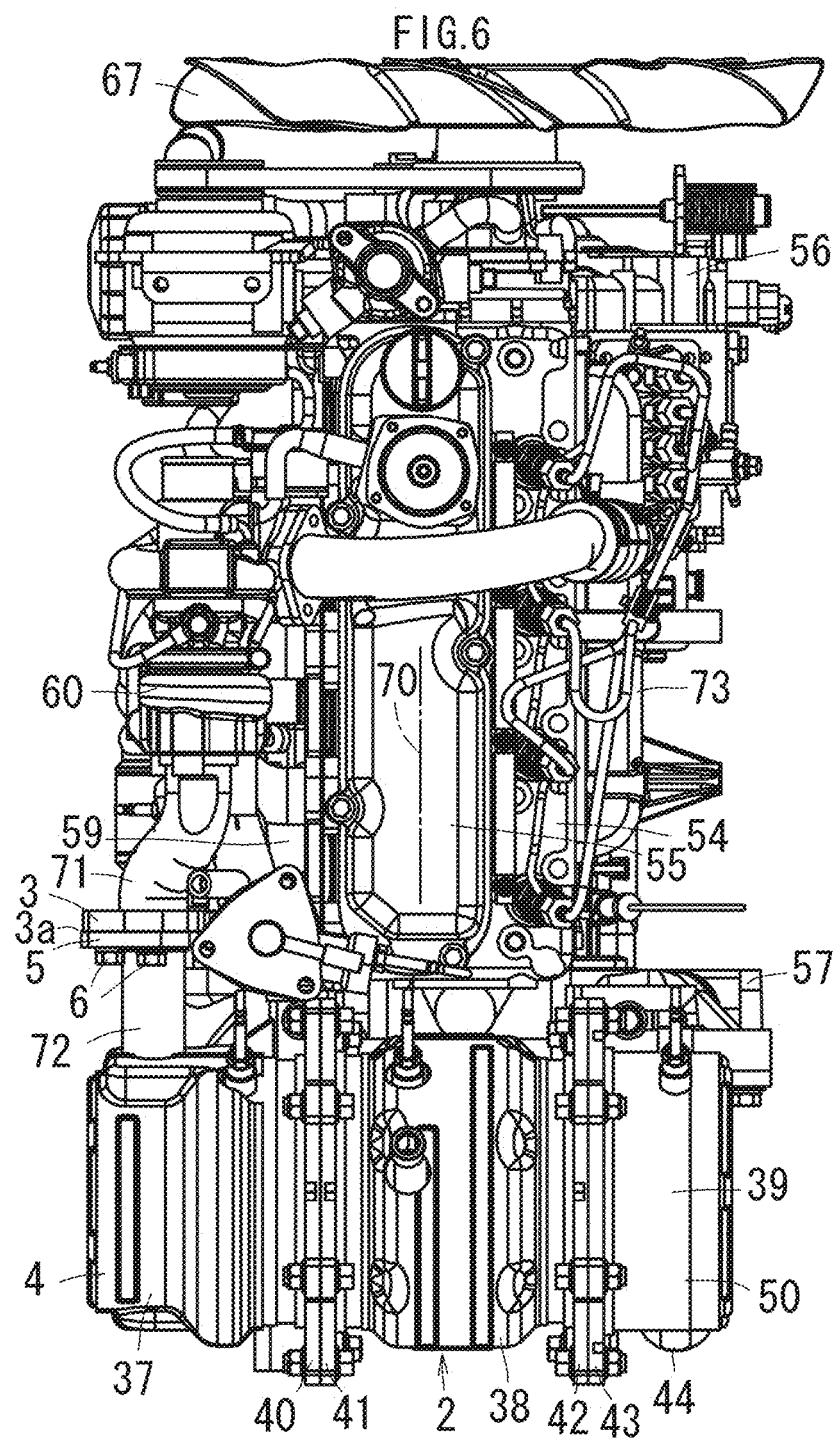
FIG. 6 is a plan view of the engine of FIG. 5.

As shown in FIG. 6, an exhaust manifold (59) is assembled on the left side of the cylinder head (54), an intake manifold (73) is assembled on the right side of the cylinder head (54), and a supercharger (60) is assembled to an upper part of the exhaust manifold (59).

In the following description of Embodiment, the one side indicates the left side, and the other side indicates the right side.

As shown in FIGS. 1(A) and 1(B), a sideways exhaust treatment device (2) is arranged on the rear upper side of the engine.

An engine exhaust outlet flange (3) is arranged on the one side of the engine, an exhaust inlet flange (5) is arranged in a one-side portion (4) of the exhaust treatment device (2), and the exhaust inlet flange (5) is attached to the engine exhaust outlet flange (3) by exhaust flange fastening tools (6) (6) (6).

The engine exhaust outlet flange (3) is provided in a rear end of an engine exhaust outlet pipe (71) attached to the supercharger (60), and the exhaust inlet flange (5) is provided in a front end of an exhaust inlet pipe (72) extended forward from the one-end side portion (4) of the exhaust treatment device (2).

A one-side support stay mount surface (8) and an other-side support stay mount surface (9) are provided in an engine rear upper portion (7). A front portion (10a) of a one-side support stay (10) is mounted on the one-side support stay mount surface (8) and attached by a one-side support stay fastening tool (11). A front portion (12a) of an other-side support stay (12) is mounted on the other-side support stay mount surface (9) and attached by an other-side support stay fastening tool (13). The exhaust treatment device (2) is supported on the engine rear upper portion (7) via the one-side support stay (10) and the other-side support stay (12).

As shown in FIG. 1(B), a DOC (52) and the DPF (51) are housed inside the exhaust treatment device (2). The DOC (52) is arranged on the upstream side and the DPF (51) is arranged on the downstream side.

The DOC (52) is an abbreviation of a diesel oxidation catalyst, and the DPF (51) is an abbreviation of a diesel particulate filter.

In the exhaust treatment device (2), the DPF (51) catches PMs (particle matters) contained in exhaust, and the DOC (52) oxidizes unburnt fuel blown from a combustion chamber and unburnt fuel jetted in an exhaust route. A temperature of the exhaust is increased by oxidization heat, and the PMs accumulated in the DPF (51) are combusted, so that the DPF (51) is regenerated.

The exhaust treatment device (2) may be an exhaust muffler or a catalytic converter.

As shown in FIGS. 1(A) and 1(B), one-side support portions (14) (14) are provided in the one-side support stay (10), and other-side support portions (15) (15) are provided in the other-side support stay (12).

One-side supported portions (16) (16) and other-side supported portions (17) (17) are provided in the exhaust treatment device (2).

Upon attaching the one-side supported portions (16) (16) of the exhaust treatment device (2) to the one-side support portions (14) (14) of the one-side support stay (10) by one-side supported portion fastening tools (18) (18) and attaching the other-side supported portions (17) (17) of the exhaust treatment device (2) to the other-side support portions (15) (15) of the other-side support stay (12) by other-side supported portion fastening tools (19) (19), the following processes are taken.

As shown in FIG. 1(A), a cutout groove (20) having an opening (23) in one end is provided in the front portion (12a) of the other-side support stay (12), and the other-side support stay fastening tool (13) attached to the other-side support stay mount surface (9) is inserted into the cutout groove (20).

Thereby, in a case where the other-side support stay fastening tool (13) is brought into the cutout groove (20) from the opening (23) while guiding the front portion (12a) of the other-side support stay (12) by the other-side support stay mount surface (9), rotation moment of the other-side support stay (12) generated by a load of an other-side portion (50) of the exhaust treatment device (2) is received by the other-side support stay fastening tool (13) via an edge portion (21) of the cutout groove (20), so that the load of the other-side portion (50) of the exhaust treatment device (2) can be supported by the other-side support stay (12).

Figure 2A:
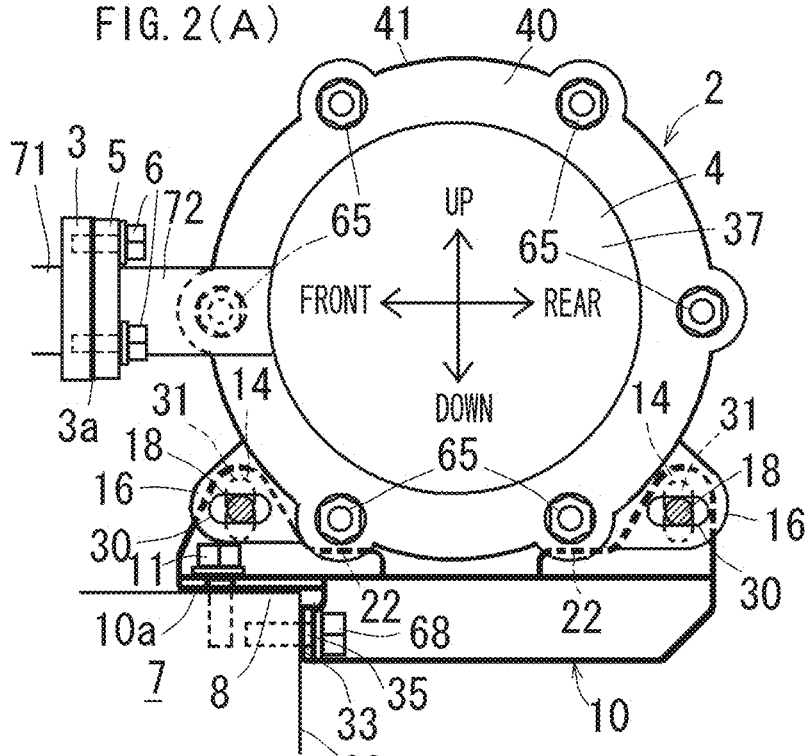

As shown in FIG. 2(A), one-side temporary mount portions (22) (22) are provided in the one-side support stay (10).

Thereby, the one-side portion (4) of the exhaust treatment device (2) before being attached to the engine exhaust outlet flange (3) and the one-side support stay (10) can be temporarily mounted onto the one-side temporary mount portions (22) (22).

Rotation moment of the one-side support stay (10) generated by a load of the one-side portion (4) of the exhaust treatment device (2) is received by the one-side support stay fastening tool (11) via an edge part of a fastening tool insertion hole (62) to be described later, so that the load of the one-side portion (4) of the exhaust treatment device (2) is supported by the one-side support stay (10).

As shown in FIGS. 1(A) and 1(B), the exhaust flange fastening tools (6) (6) (6) are bolts passing through bolt insertion holes (5a) (5a) (5a) of the exhaust inlet flange (5) and being screwed into screw holes of the engine exhaust outlet flange (3). Three bolt insertion holes (5a) (5a) (5a) are arranged at a distant angle of 120° in the circumferential direction of the exhaust inlet flange (5) by the angle, and three exhaust flange fastening tools (6) (6) (6) are also arranged.

The one-side support stay fastening tool (11) is a bolt passing through a fastening tool insertion hole of the front portion (10a) of the one-side support stay (10) and being screwed into a screw hole of the one-side support stay mount surface (8).

Both the one-side supported portion fastening tools (18) (18) and the other-side supported portion fastening tools (19) (19) are bolt nuts.

As shown in FIGS. 1(A) and 1(B), the cutout groove (20) of the other-side support stay (12) is formed sideways.

Thereby, upon mounting the front portion (12a) of the other-side support stay (12) onto the other-side support stay mount surface (9), the other-side support stay fastening tool (13) is brought into the cutout groove (20) sideways from the opening (23), so that a lateral position of the other-side support stay (12) is adjustable.

The cutout groove (20) is parallel to a laterally horizontal axis which is orthogonal to a crankshaft axis (70) serving as a front-rear horizontal axis. The opening (23) is provided on the other side of the cutout groove (20).

As shown in FIG. 1(A), the engine exhaust outlet flange (3) is formed so as to face the rear side and the exhaust inlet flange (5) is formed so as to face the front side.

Thereby, upon attaching the exhaust inlet flange (5) to the engine exhaust outlet flange (3), in a case where a gasket (3a) is nipped between the engine exhaust outlet flange (3) and the exhaust inlet flange (5) and the exhaust inlet flange (5) is attached to the engine exhaust outlet flange (3) by the exhaust flange fastening tools (6) (6) (6), the exhaust treatment device (3) is positioned in the front and rear direction.

As shown in FIGS. 1(A) and 1(B), an other-side stay pressure receiving surface (34) is provided in an engine rear surface (32) and an other-side support stay positioning piece (36) is provided in the other-side support stay (12).

Thereby, in a case where the other-side support stay positioning piece (36) is abutted with the other-side stay pressure receiving surface (34) from the rear side, the other-side support stay (12) is positioned in the front and rear direction.

All the engine exhaust outlet flange (3), the exhaust inlet flange (5), the other-side stay pressure receiving surface (34), and the other-side support stay positioning piece (36) are parallel to a front-rear vertical plane which is orthogonal to the crankshaft axis (70) serving as the front-rear horizontal axis.

As shown in FIGS. 1(A) and 1(B), mating surfaces (24) (24) are provided in the other-side support portions (15) (15) of the other-side support stay (12), mating surfaces (25) (25) are provided in the other-side supported portions (17) (17) of the exhaust treatment device (2), and both the mating surfaces (24) (25) are directed to the side so as to face each other.

Thereby, for adjusting the lateral position of the other-side support stay (12), the mating surfaces (24) (24) of the other-side support portions (15) (15) of the other-side support stay (12) can be overlapped with the mating surfaces (25) (25) of the other-side supported portions (17) (17) of the exhaust treatment device (2) from the side.

The other-side supported portion fastening tools (19) (19) can be fastened while axes thereof are placed sideways.

Both the mating surfaces (24) (25) are formed along the vertical plane which is orthogonal to the front-rear axis.

As shown in FIG. 1(B), the pair of front and rear other-side supported portion fastening tools (19) (19) is provided.

Among a fastening tool insertion hole (26) of the other-side supported portion (17) through which the front other-side supported portion fastening tool (19) is inserted and a fastening tool insertion hole (27) of the other-side support portion (15), the former is a front-rear long hole, and the latter is a circular hole. These holes are overlapped side by side, and the front other-side supported portion fastening tool (19) is placed at a position where the front-rear long hole and the circular hole are overlapped on the front side.

The former may be a circular hole and the latter may be a front-rear long hole.

The front-rear long hole is parallel to the crankshaft axis (70) serving as the front-rear horizontal axis.

Among a fastening tool insertion hole (26) of the other-side supported portion (17) through which the rear other-side supported portion fastening tool (19) is inserted and a fastening tool insertion hole (27) of the other-side support portion (15), the former is a front-rear long hole, and the latter is an up-down long hole. These holes are crossed and overlapped side by side, and the rear other-side supported portion fastening tool (19) is placed at a position where the front-rear long hole and the up-down long hole are crossed on the rear side.

The former may be an up-down long hole and the latter may be a front-rear long hole.

The front-rear long hole is parallel to the crankshaft axis (70) serving as the front-rear horizontal axis, and the up-down long hole is parallel to the vertical axis.

As shown in FIG. 1(A), the fastening tool insertion hole (62) serving as a lateral long hole is provided in the front portion (10a) of the one-side support stay (10).

Thereby, upon mounting the front portion (10a) of the one-side support stay (10) onto the one-side support stay mount surface (8), the one-side support stay fastening tool (11) is inserted into the fastening tool insertion hole (62) serving as the lateral long hole, and the one-side support stay (10) can be attached to the one-side support stay mount surface (8) by the one-side support stay fastening tool (11) in such a manner that a lateral position is adjustable.

As shown in FIGS. 1(A) and 1(B), a one-side stay pressure receiving surface (33) is provided in the engine rear surface (32), and a one-side support stay positioning piece (35) is provided in the front portion (10a) of the one-side support stay (10).

Thereby, in a case where the one-side support stay positioning piece (35) is abutted with the one-side stay pressure receiving surface (33) from the rear side, the one-side support stay (10) is positioned in the front and rear direction.

Both the one-side stay pressure receiving surface (33) and the one-side support stay positioning piece (35) are parallel to the front-rear vertical plane which is orthogonal to the crankshaft axis (70) serving as the front-rear horizontal axis.

As shown in FIGS. 1(A) and 1(B), mating surfaces (28) (28) are provided in the one-side support portions (14) (14) of the one-side support stay (10), mating surfaces (29) (29) are provided in the one-side supported portions (16) (16) of the exhaust treatment device (2), and both the mating surfaces (28) (29) are directed to the side so as to face each other.

Thereby, for adjusting the lateral position of the one-side support stay (10), the mating surfaces (28) (28) of the one-side support portions (14) (14) can be overlapped with the mating surfaces (29) (29) of the one-side supported portions (16) (16) of the exhaust treatment device (2) from the side.

The one-side supported portion fastening tools (18) (18) can be attached while axes thereof are placed sideways.

Both the mating surfaces (28) (29) are formed along the vertical plane which is orthogonal to the lateral axis.

As shown in FIG. 2(A), the pair of front and rear one-side supported portion fastening tools (18) (18) is provided.

Among a fastening tool insertion hole (30) of the one-side supported portion (16) through which the front one-side supported portion fastening tool (18) is inserted and a fastening tool insertion hole (31) of the one-side support portion (14), the former is a front-rear long hole, and the latter is an up-down long hole. These holes are crossed and overlapped side by side, and the front one-side supported portion fastening tool (18) is placed at a position where the front-rear long hole and the up-down long hole are crossed on the front side.

The former may be an up-down long hole and the latter may be a front-rear long hole.

The front-rear long hole is parallel to the crankshaft axis (70) serving as the front-rear horizontal axis, and the up-down long hole is parallel to the vertical axis.

Among a fastening tool insertion hole (30) of the one-side supported portion (16) through which the rear one-side supported portion fastening tool (18) is inserted and a fastening tool insertion hole (31) of the one-side support portion (14), the former is a front-rear long hole, and the latter is an up-down long hole. These holes are crossed and overlapped side by side, and the rear one-side supported portion fastening tool (18) is placed at a position where the front-rear long hole and the up-down long hole are crossed on the rear side.

The former may be an up-down long hole and the latter may be a front-rear long hole.

The front-rear long hole is parallel to the crankshaft axis (70) serving as the front-rear horizontal axis, and the up-down long hole is parallel to the vertical axis.

As shown in FIGS. 1(A) and 1(B), a part of the rotation moment of the other-side support stay (12) generated by the load of the other-side portion (50) of the exhaust treatment device (2) can be received by the other-side stay pressure receiving surface (34) of the engine rear surface (32) via the other-side support stay positioning piece (36), and a part of the rotation moment of the one-side support stay (10) generated by the load of the one-side portion (4) of the exhaust treatment device (2) can be received by the one-side stay pressure receiving surface (33) of the engine rear surface (32) via the one-side support stay positioning piece (35).

As shown in FIGS. 3(A) to 3(E), in the one-side support stay (10), a left vertical plate (61) is bent and formed downward from a left edge part of a horizontal plate (64), the one-side support stay positioning piece (35) is bent and formed leftward from a rear edge of the left vertical plate (61), and the pair of front and rear one-side support portions (14) (14) and the one-side temporary mount portions (22) (22) are bent and formed upward from a right edge part of the horizontal plate (64). The fastening tool insertion hole (62) is provided in the front portion (10a) of the one-side support stay (10), and the fastening tool insertion hole (62) is formed to be the lateral long hole. The fastening tool insertion holes (31) (31) are also provided in the one-side support portions (14) (14), and the fastening tool insertion holes (31) (31) are formed to be up-down long holes. A fastening tool insertion hole (63) is also provided in the one-side support stay positioning piece (35), and the fastening tool insertion hole (63) is formed to be a lateral long hole.

As shown in FIGS. 4(A) to 4(E), in the other-side support stay (12), the pair of front and rear other-side support portions (15) (15) is bent and formed upward from a left edge part of a horizontal plate (48). The fastening tool insertion holes (27) (27) are provided in the other-side support portions (15) (15), the front fastening tool insertion hole (27) is a circular hole, and the rear fastening tool insertion hole (27) is an up-down long hole. A fastening nut (66) which is concentric with the fastening tool insertion hole (27) is fixed to the front other-side support portion (15) by welding. The fastening nut (66) is combined with a bolt so as to form the other-side supported portion fastening tool (19).

The front portion (12a) of the other-side support stay (12) is formed to be wider than a rear portion and provided with the cutout groove (20) having the opening (23) on the right side, and the other-side support stay positioning piece (36) is bent and formed downward from a rear edge part of the front portion. A fastening tool insertion hole (64) is provided in the other-side support stay positioning piece (36), and the fastening tool insertion hole (64) is formed to be a lateral long hole.

As shown in FIGS. 1(A) and 1(B), a casing of the exhaust treatment device (2) includes a plurality of dividable casing parts (37) (38) (39), and coupling flanges (40) (41) (42) (43) are provided at divided points of the plurality of casing parts (37) (38) (39).

As shown in FIGS. 1(A), 1(B), 2(A), and 2(B), the one-side supported portions (16) (16) and the other-side supported portions (17) (17) of the exhaust treatment device (2) are extended from the coupling flanges (41) (42).

The coupling flanges (41) (42) are coupling flanges in both ends of the DPF housing casing part (38) to be described later.

The one-side supported portions (16) (16) and the other-side supported portions (17) (17) of the exhaust treatment device (2) may be extended from the coupling flange (40) of the exhaust inlet flange (5) and the coupling flange (43) of the exhaust outlet side casing part (39).

As shown in FIGS. 1(A) and 1(B), the casing of the exhaust treatment device (2) includes the exhaust inlet side casing part (37) provided with the exhaust inlet flange (5), the DPF housing casing part (38), and the exhaust outlet side casing part (39) provided with an exhaust outlet pipe (44).

As shown in FIGS. 1(A) and 1(B), the exhaust inlet side casing part (37) and the exhaust outlet side casing part (39) are detachable from the DPF housing casing part (38).

Figure 2B:
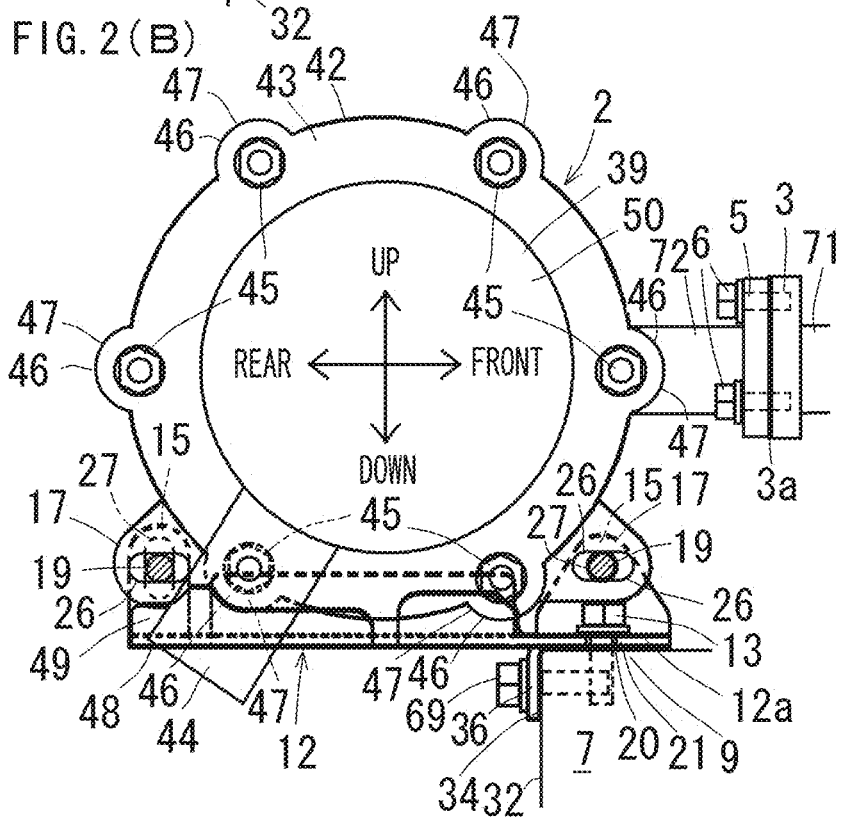
Figure 5:
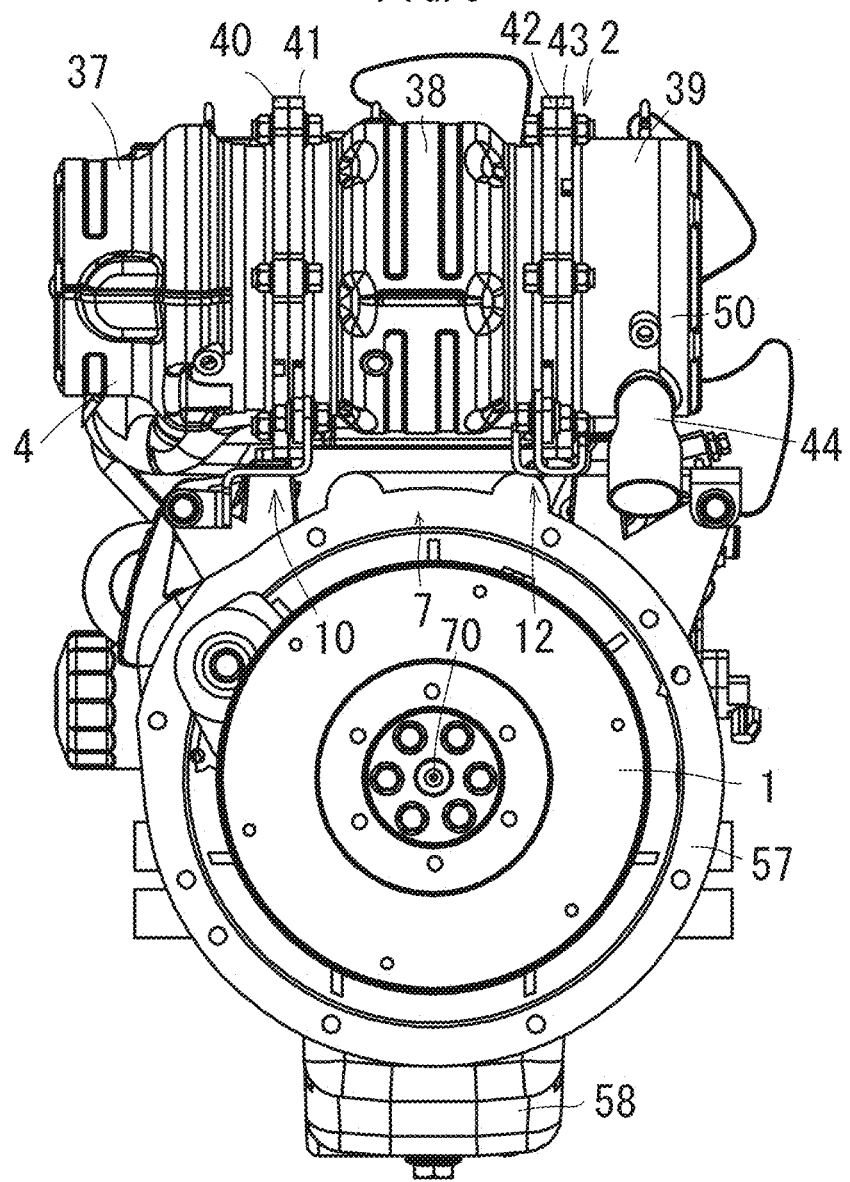
FIG. 5 is a rear view of the vertical engine with the exhaust treatment device according to Embodiment of the present invention.

As shown in FIGS. 1(B) and 2(B), the exhaust outlet pipe (44) protrudes from an outer peripheral surface of the exhaust outlet side casing part (39), and the coupling flanges (42) (43) at the divided point of the DPF housing casing part (38) and the exhaust outlet side casing part (39) are coupled by fastening of a plurality of flange fastening tools (45) (45) (45) (45) (45) (45).

As shown in FIG. 2(B), a plurality of fastened portions (46) (46) (46) (46) (46) (46) is arranged in the coupling flange (42) of the DPF housing casing part (38) at an equal distant angle in the circumferential direction of the coupling flange, and a plurality of fastened portions (47) (47) (47) (47) (47) (47) is arranged in the coupling flange (43) of the exhaust outlet side casing part (39) at an equal distant angle in the circumferential direction of the coupling flange.

As shown in FIG. 2(B), by displacing the exhaust outlet side casing part (39) in the circumferential direction by the distant angle, matching the fastened portions (47) (47) (47) (47) (47) (47) of the coupling flange (43) of the exhaust outlet side casing part (39) with the fastened portions (46) (46) (46) (46) (46) (46) of the coupling flange (42) of the DPF housing casing part (38), and coupling the exhaust outlet side casing part (39) to the DPF housing casing part (38) by fastening of the flange fastening tools (45) (45) (45) (45) (45) (45), the protruding direction of the exhaust outlet pipe (44) from the outer peripheral surface of the exhaust outlet side casing part (39) can be selected.

As shown in FIGS. 1(B) and 4(A) to 4(E), upon providing the horizontal piece (48) in the other-side support stay (12) and bending and forming the other-side support portion (15) upward from a laterally inner edge of the horizontal piece (48), the following processes are taken.

As shown in FIG. 1(B), a reinforcing portion (49) facing the other-side support portion (15) is bent and formed upward from a laterally outer edge of the horizontal piece (42), and the reinforcing portion (49) is positioned on the laterally inner side of the exhaust outlet pipe (44) when seen from the rear side of the engine.

The coupling flanges (40) (41) at the divided point of the DPF housing casing part (38) and the exhaust inlet side casing part (37) are coupled by fastening of a plurality of flange fastening tools (65) (65) (65) (65) (65) (65). Each flange fastening tool (65) is arranged at an equal distant angle in the circumferential direction of the coupling flanges (40) (41).

Next, an attachment method for the exhaust treatment device (2) to the engine rear upper portion (7) of the engine will be described.

As shown in FIGS. 1(A) and 1(B), the front portion (10a) of the one-side support stay (10) is mounted onto the one-side support stay mount surface (8) and attached by the one-side support stay fastening tool (11).

The one-side support stay positioning piece (35) is abutted with the one-side stay pressure receiving surface (33) from the rear side and attached by a one-side positioning piece fastening tool (68).

The other-side support stay fastening tool (13) is attached to the other-side support stay mount surface (9).

The other-side support portions (15) (15) of the other-side support stay (12) are loosely attached to the other-side supported portions (17) (17) of the exhaust treatment device (2) by the other-side supported portion fastening tools (19) (19), so as to oscillatably couple the other-side support stay (12) to the exhaust treatment device (2).

As shown in FIG. 1(A), by bringing the other-side support stay fastening tool (13) into the cutout groove (20) from the opening (23) while guiding the front portion (12a) of the other-side support stay (12) by the other-side support stay mount surface (9), the rotation moment of the other-side support stay (12) generated by the load of the other-side portion (50) of the exhaust treatment device (2) is received by the other-side support stay fastening tool (13) via the edge portion (21) of the cutout groove (20), so that the load of the other-side portion (50) of the exhaust treatment device (2) is supported by the other-side support stay (12).

The other-side support stay positioning piece (36) is abutted with the other-side stay pressure receiving surface (34) from the rear side and attached by a one-side positioning piece fastening tool (69).

The one-side portion (4) of the exhaust treatment device (2) is lowered taking the front other-side supported portion fastening tool (19) supported by the other-side support stay (12) shown in FIG. 2(B) as a supporting point so as to temporarily mount the one-side portion (4) of the exhaust treatment device (2) before being attached to the engine exhaust outlet flange (3) and the one-side support stay (10) onto the one-side temporary mount portions (22) (22).

The one-side portion (4) of the exhaust treatment device (2) is mounted by mounting the lower pair of front and rear flange fastening tools (65) (65) for coupling the coupling flanges (40) (41) at the divided point of the exhaust inlet side casing part (37) and the DPF housing casing part (38) onto the one-side temporary mount portions (22) (22).

The one-side portion (4) of the exhaust treatment device (2) temporarily mounted on the one-side temporary mount portions (22) (22) shown in FIG. 2(A) is lifted taking the front other-side supported portion fastening tool (19) supported by the other-side support stay (12) shown in FIG. 1(B) as a supporting point so as to attach the exhaust inlet flange (5) to the engine exhaust outlet flange (3) by the exhaust flange fastening tools (6) (6) (6) as shown in FIG. 1(A).

Specifically, the following processes are taken.

Upon mounting the front portion (12a) of the other-side support stay (12) onto the other-side support stay mount surface (9), as shown in FIG. 1(A), the other-side support stay fastening tool (13) is brought into the cutout groove (20) sideways from the opening (23), so that the lateral position of the other-side support stay (12) is adjustable.

As shown in FIG. 1(A), upon attaching the exhaust inlet flange (5) to the engine exhaust outlet flange (3), the gasket (3a) is nipped between the engine exhaust outlet flange (3) and the exhaust inlet flange (5) and the exhaust inlet flange (5) is attached to the engine exhaust outlet flange (3) by the exhaust flange fastening tools (6) (6) (6), so that the exhaust treatment device (3) is positioned in the front and rear direction.

The exhaust inlet flange (5) is attached to the engine exhaust outlet flange (3) by temporary fastening of the exhaust flange fastening tools (6) (6) (6). Therefore, due to a backlash of the exhaust flange fastening tools (6) (6) (6) and the bolt insertion holes (5a) of the exhaust inlet flange (5), the other-end side portion (50) of the exhaust treatment device (2) is oscillatable taking any exhaust flange fastening tool (6) as a supporting point.

The temporary fastening indicates a fastening state that an object to be fastened is not moved in the fastening direction of a fastening tool but slidable in the direction which is orthogonal to the fastening direction.

Meanwhile, regular fastening to be described later indicates a fastening state that the object to be fastened is neither moved in the fastening direction of the fastening tool nor slidable in the direction which is orthogonal to the fastening direction.

As shown in FIGS. 1(A) and 1(B), the other-side support stay positioning piece (36) is abutted with the other-side stay pressure receiving surface (34) from the rear side, so that the other-side support stay (12) is positioned in the front and rear direction.

As shown in FIGS. 1(A) and 1(B), for adjusting the lateral position of the other-side support stay (12), the mating surfaces (24) (24) of the other-side support portions (15) (15) of the other-side support stay (12) are overlapped with the mating surfaces (25) (25) of the other-side supported portions (17) (17) of the exhaust treatment device (2) from the side.

The other-side supported portion fastening tools (19) (19) are fastened while the axes thereof are placed sideways.

This fastening is performed by the temporary fastening.

As shown in FIGS. 1(A) and 1(B), the load of the one-side portion (4) of the exhaust treatment device (2) is supported by the exhaust flange fastening tool (6) positioned in the up and down direction and the lateral direction by attachment to the engine exhaust outlet flange (3), and the load of the other-side portion (50) of the exhaust treatment device (2) is supported by the other-side support stay (12) via the front other-side supported portion fastening tool (19) whose up-down position is set at the overlapping position of the circular hole and the front-rear long hole on the front side.

The exhaust treatment device (2) is retained at a predetermined attachment posture positioned in the front and rear direction, the lateral direction, and the up and down direction.

Thereby, as shown in FIG. 2(B), the rear other-side supported portion fastening tool (19) is set at the crossing position of the front-rear long hole and the up-down long hole on the rear side.

After that, fastening of the pair of front and rear other-side supported portion fastening tools (19) (19) is enhanced, so that the other-side supported portions (17) (17) are fixed to the other end-side support portions (15) (15).

This fastening is performed by the regular fastening.

During positioning in the front and rear direction and position setting in the lateral direction of the other-side support stay (12), the fastening tools are fastened by the temporary fastening. When the positioning and the position setting are finished, the fastening tools are fastened by the regular fastening.

One example of specific fastening procedure is as follows.

After the temporary fastening of the front other-side supported portion fastening tool (19), the temporary fastening of the rear other-side supported portion fastening tool (19), and the temporary fastening of the other-side support stay fastening tool (13) are performed in order, and the positioning in the front and rear direction and the position setting in the lateral direction of the other-side support stay (12) are performed, the regular fastening of the other-side positioning piece fastening tool (69), the regular fastening of the other-side support stay fastening tool (13), the regular fastening of the front other-side supported portion fastening tool (19), and the regular fastening of the rear other-side supported portion fastening tool (19) are performed in order.

After that, the regular fastening of the exhaust flange fastening tools (6) (6) (6) is performed.

Upon mounting the front portion (10a) of the one-side support stay (10) onto the one-side support stay mount surface (8), the following processes are taken.

As shown in FIG. 1(A), the one-side support stay fastening tool (11) is inserted into the fastening tool insertion hole (62) serving as the lateral long hole, and the one-side support stay (10) is attached to the one-side support stay mount surface (8) by the one-side support stay fastening tool (11) in such a manner that the lateral position is adjustable.

As shown in FIGS. 1(A) and 1(B), the one-side support stay positioning piece (35) is abutted with the one-side stay pressure receiving surface (33) from the rear side, so that the one-side support stay (10) is positioned in the front and rear direction.

For adjusting the lateral position of the one-side support stay (10), the mating surfaces (28) (28) of the one-side support portions (14) (14) of the one-side support stay (10) are overlapped with the mating surfaces (29) (29) of the one-side supported portions (16) (16) of the exhaust treatment device (2) from the side.

The one-side supported portion fastening tools (18) (18) are attached while the axes thereof are placed sideways.

As shown in FIG. 1(A), the mating surfaces (28) (28) of the one-side support portions (14) (14) of the one-side support stay (10) positioned in the front and rear direction are overlapped with the mating surfaces (29) (29) of the one-side supported portions (16) (16) of the exhaust treatment device (2) retained at the predetermined attachment posture from the side.

Thereby, as shown in FIG. 2(A), the crossing position of the up-down long hole and the front-rear long hole on the front side is set and the crossing position of the up-down long hole and the front-rear long hole on the rear side is set.

The pair of front and rear one-side supported portion fastening tools (18) (18) is inserted and attached to the set pair of front and rear crossing positions, so that the one-side supported portions (16) (16) are fixed to the one-side support portions (14) (14).

During positioning in the front and rear direction and position setting in the lateral direction of the one-side support stay (10), the fastening tools are fastened by the temporary fastening. When the positioning and the position setting are finished, the fastening tools are fastened by the regular fastening.

One example of specific procedure is as follows.

After the temporary fastening of the one-side positioning piece fastening tool (68), the temporary fastening of the one-side support stay fastening tool (11), and the temporary fastening of the rear one-side supported portion fastening tool (18) are performed in order, and the positioning in the front and rear direction and the position setting in the lateral direction of the one-side support stay (10) are performed, the regular fastening of the front one-side supported portion fastening tool (18), the regular fastening of the one-side positioning piece fastening tool (68), the regular fastening of the one-side support stay fastening tool (11), and the regular fastening of the rear one-side supported portion fastening tool (18) are performed in order.

As shown in FIGS. 1(A) and 1(B), a part of the rotation moment of the other-side support stay (12) generated by the load of the other-side portion (50) of the exhaust treatment device (2) is received by the other-side stay pressure receiving surface (34) of the engine rear surface (32) via the other-side support stay positioning piece (36), and a part of the rotation moment of the one-side support stay (10) generated by the load of the one-side portion (4) of the exhaust treatment device (2) is received by the one-side stay pressure receiving surface (33) of the engine rear surface (32) via the one-side support stay positioning piece (35).

DESCRIPTION OF REFERENCE SIGNS (1): Flywheel
(2): Exhaust treatment device
(3): Engine exhaust outlet flange
(3a): Gasket
(4): One-side portion of exhaust treatment device
(5): Exhaust inlet flange
(6): Exhaust flange fastening tool
(7): Engine rear upper portion
(8): One-side support stay mount surface
(9): Other-side support stay mount surface
(10): One-side support stay
(10a): Front portion
(11): One-side support stay fastening tool
(12): Other-side support stay
(12a): Front portion
(13): Other-side support stay fastening tool
(14): One-side support portion
(15): Other-side support portion
(16): One-side supported portion
(17): Other-side supported portion
(18): One-side supported portion fastening tool
(19): Other-side supported portion fastening tool
(20): Cutout groove
(21): Edge portion
(22): One-side temporary mount portion
(23): Opening
(24): Mating surface
(25): Mating surface
(26): Fastening tool insertion hole
(27): Fastening tool insertion hole
(28): Mating surface
(29): Mating surface
(30): Fastening tool insertion hole
(31): Fastening tool insertion hole
(32): Engine rear surface
(33): One-side support stay pressure receiving surface
(34): Other-side support stay pressure receiving surface
(35): One-side support stay positioning piece
(36): Other-side support stay positioning piece
(37): Exhaust inlet side casing part
(38): DPF housing casing part
(39): Exhaust outlet side casing part
(40): Coupling flange
(41): Coupling flange
(42): Coupling flange
(43): Coupling flange
(44): Exhaust outlet pipe
(45): Flange fastening tool
(46): Fastened portion
(47): Fastened portion (48): Horizontal piece
(49): Reinforcing portion
(50): Other-side portion of exhaust treatment device
(62): Fastening tool insertion hole

The invention claimed is:

1. An engine comprising:
a flywheel (1) on a rear side of the engine, wherein an installing direction of a crankshaft defines a front and rear direction and a width direction of the engine defines a lateral direction;
a sideways exhaust treatment device (2) arranged on a rear upper side of the engine, having a one-side portion (4) and an other-side portion (50);
an engine exhaust outlet flange (3) arranged on one side of the engine, an exhaust inlet flange (5) arranged in the one-side portion (4), and the exhaust inlet flange (5) being attached to the engine exhaust outlet flange (3) by exhaust flange fastening tools (6);
a one-side support stay mount surface (8) and an other-side support stay mount surface (9) provided in an engine rear upper portion (7);
a one-side support stay (10) mounted on the one-side support stay mount surface (8) and attached by a one-side support stay fastening tool (11);
an other-side support stay (12) having a front portion (12a) thereof mounted on the other-side support stay mount surface (9) and attached by an other-side support stay fastening tool (13), such that the exhaust treatment device (2) is supported on the engine rear upper portion (7) via the one-side support stay (10) and the other-side support stay (12);
a laterally extending cutout groove (20) in an end of the front portion (12a) of the other-side support stay (12), having an edge portion (21) and a side opening (23) in one end thereof, the other-side support stay fastening tool (13) being laterally insertable into the cutout groove (20) via the side opening (23);
one-side support portions (14) provided in the one-side support stay (10);
other-side support portions (15) provided in the other-side support stay (12);
one-side supported portions (16) and other-side supported portions (17) provided in the exhaust treatment device (2); and
one-side temporary mount portions (22) located in the one-side support stay (10);
wherein:
the one-side supported portions (16) of the exhaust treatment device (2) are attached to the one-side support portions (14) of the one-side support stay (10) via one-side supported portion fastening tools (18), and the other-side supported portions (17) of the exhaust treatment device (2) are attached to the other-side support portions (15) of the other-side support stay (12) via other-side supported portion fastening tools (19);
rotational moment of the other-side support stay (12) generated by a load of the other-side portion (50) of the exhaust treatment device (2) is received by the other-side support stay fastening tool (13) via the edge portion (21) of the cutout groove (20) if the other-side support stay fastening tool (13) is brought into the cutout groove (20) from the opening (23) while guiding the front portion (12a) of the other-side support stay (12) by the other-side support stay mount surface (9), such that the load of the other-side portion (50) of the exhaust treatment device (2) is supported by the other-side support stay (12); and
the one-side portion (4) of the exhaust treatment device (2) and the one-side support stay (10) are temporarily mountable on the one-side temporary mount portions (22).

2. The engine according to claim 1, wherein a casing of the exhaust treatment device (2) includes a plurality of dividable casing parts (37) (38) (39), and coupling flanges (40) (41) (42) (43) are provided at divided points of the plurality of casing parts (37) (38) (39); and the one-side supported portions (16) and the other-side supported portions (17) of the exhaust treatment device (2) are extended from the coupling flanges (41) (42).

3. The engine according to claim 2, wherein the casing of the exhaust treatment device (2) includes an exhaust inlet side casing part (37) provided with the exhaust inlet flange (5), a DPF housing casing part (38), and an exhaust outlet side casing part (39) provided with an exhaust outlet pipe (44); and the exhaust inlet side casing part (37) and the exhaust outlet side casing part (39) are detachable from the DPF housing casing part (38).

4. The engine according to claim 3, wherein the exhaust outlet pipe (44) protrudes from an outer peripheral surface of the exhaust outlet side casing part (39), the coupling flange (42) is a flange of the DPF housing casing part (38), including a plurality of fastened portions (46) arranged therein at an equal distant angle in the circumferential direction of the coupling flange, and the coupling flange (43) is a flange of the exhaust outlet side casing part (39), including a plurality of fastened portions (47) arranged therein at an equal distant angle in the circumferential direction of the coupling flange;
the coupling flanges (42), (43) being located at a divided point between the DPF housing casing part (38) and the exhaust outlet side casing part (39) and being coupled by a plurality of flange fastening tools (45); and
the fastened portions (47) being matched with the fastened portions (46), such that the protruding direction of the exhaust outlet pipe (44) from the outer peripheral surface of the exhaust outlet side casing part (39) is achieved.

5. The engine according to claim 4, further comprising a horizontal plate (48) in the other-side support stay (12), wherein the other-side support portions (15) are bent and formed upwardly from a laterally inner edge of the horizontal plate (48), and further comprising a reinforcing portion (49) facing the other-side support portions (15) being bent and formed upwardly from a laterally outer edge of the horizontal plate (48), the reinforcing portion (49) being positioned on a laterally inner side of the exhaust outlet pipe (44) when seen from the rear side of the engine.

6. A method for attaching the exhaust treatment device (2) of the engine according to claim 1 to the engine rear upper portion (7), wherein the method comprises the steps of:
mounting the front portion (10a) of the one-side support stay (10) onto the one-side support stay mount surface (8) and attaching by the one-side support stay fastening tool (11);
attaching the other-side support stay fastening tool (13) to the other-side support stay mount surface (9);
attaching the other-side support portions (15) of the other-side support stay (12) to the other-side supported portions (17) of the exhaust treatment device (2) by the other-side supported portion fastening tools (19), so as to oscillatably couple the other-side support stay (12) to the exhaust treatment device (2);

by bringing the other-side support stay fastening tool (13) into the cutout groove (20) from the opening (23) while guiding the front portion (12*a*) of the other-side support stay (12) by the other-side support stay mount surface (9), receiving the rotation moment of the other-side support stay (12) generated by the load of the other-side portion (50) of the exhaust treatment device (2) by the other-side support stay fastening tool (13) via the edge portion (21) of the cutout groove (20) so as to support the load of the other-side portion (50) of the exhaust treatment device (2) by the other-side support stay (12);

lowering the one-side portion (4) of the exhaust treatment device (2) taking the other-side supported portion fastening tool (19) supported by the other-side support stay (12) as a supporting point so as to temporarily mount the one-side portion (4) of the exhaust treatment device (2) before being attached to the engine exhaust outlet flange (3) and the one-side support stay (10) onto the one-side temporary mount portions (22); and lifting the one-side portion (4) of the exhaust treatment device (2) temporarily mounted on the one-side temporary mount portions (22) taking the other-side supported portion fastening tool (19) supported by the other-side support stay (12) as a supporting point so as to attach the exhaust inlet flange (5) to the engine exhaust outlet flange (3) by the exhaust flange fastening tools (6).

7. The method according to claim 6, further comprising the steps of:

bringing the other-side support stay fastening tool (13) into the cutout groove (20) sideways from the opening (23), so that the lateral position of the other-side support stay (12) is adjustable, upon mounting the front portion (12*a*) of the other-side support stay (12) onto the other-side support stay mount surface (9);

nipping the gasket (3*a*) between the engine exhaust outlet flange (3) and the exhaust inlet flange (5), upon mounting the front portion (12*a*) of the other-side support stay (12) onto the other-side support stay mount surface (9), and attaching the exhaust inlet flange (5) to the engine exhaust outlet flange (3) by the exhaust flange fastening tools (6), so that the exhaust treatment device (3) is positioned in the front and rear direction;

abutting an other-side support stay positioning piece (36) with an other-side stay pressure receiving surface (34) from the front side, so that the other-side support stay (12) is positioned in the front and rear direction; and overlapping mating surfaces (24) of the other-side support portions (15) of the other-side support stay (12) with mating surfaces (25) of the other-side supported portions (17) of the exhaust treatment device (2) from the side; and fastening the other-side supported portion fastening tools (19) while the axes thereof are placed sideways, for adjusting the lateral position of the other-side support stay (12).

8. The method according to claim 7, further comprising the steps of:

supporting a load of the one-side portion (4) of the exhaust treatment device (2) by the exhaust flange fastening tool (6) positioned in an up and down direction and the lateral direction by attachment to the engine exhaust outlet flange (3), supporting the load of the other-side portion (50) of the exhaust treatment device (2) by the other-side support stay (12) via the front other-side supported portion fastening tool (19) whose up-down position is set at the overlapping position of the circular hole and the front-rear long hole on the front side; and retaining the exhaust treatment device (2) at a predetermined attachment posture positioned in the front and rear direction, the lateral direction, and the up and down direction; thereby, setting the rear other-side supported portion fastening tools (19) at the crossing position of the front-rear long hole and the up-down long hole on the rear side; and then, fastening of the pair of front and rear other-side supported portion fastening tools (19) is enhanced, so that the other-side supported portions (17) are fixed to the other end-side support portions (15).

9. The method according to claim 7, wherein a part of the rotation moment of the other-side support stay (12) generated by the load of the other-side portion (50) of the exhaust treatment device (2) is received by the other-side stay pressure receiving surface (34) of the engine rear surface (32) via the other-side support stay positioning piece (36), and a part of the rotation moment of the one-side support stay (10) generated by the load of the one-side portion (4) of the exhaust treatment device (2) is received by a one-side stay pressure receiving surface (33) of the engine rear surface (32) via a one-side support stay positioning piece (35).

10. The method according to claim 7, wherein upon mounting the front portion (10*a*) of the one-side support stay (10) onto the one-side support stay mount surface (8); further comprising the steps of:

inserting the one-side support stay fastening tool (11) into a fastening tool insertion hole (62) serving as a lateral long hole, attaching the one-side support stay (10) to the one-side support stay mount surface (8) by the one-side support stay fastening tool (11) in such a manner that the lateral position is adjustable;

such that a one-side support stay positioning piece (35) is abutted with a one-side stay pressure receiving surface (33) from the front side, so that the one-side support stay (10) is positioned in the front and rear direction; for adjusting the lateral position of the one-side support stay (10), mating surfaces (28) of the one-side support portions (14) of the one-side support stay (10) are overlapped with mating surfaces (29) of the one-side supported portions (16) of the exhaust treatment device (2) from the side; and the one-side supported portion fastening tools (18) are attached while the axes thereof are placed sideways.

11. The method according to claim 10, wherein by overlapping the mating surfaces (28) of the one-side support portions (14) of the one-side support stay (10) positioned in the front and rear direction with the mating surfaces (29) of the one-side supported portions (16) of the exhaust treatment device (2) retained at the predetermined attachment posture from the side, the crossing position of the up-down long hole and the front-rear long hole on the front side is set and the crossing position of the up-down long hole and the front-rear long hole on the rear side is set, and the pair of front and rear one-side supported portion fastening tools (18) is inserted and attached to the set pair of front and rear crossing positions, so that the one-side supported portions (16) are fixed to the one-side support portions (14).

12. An engine comprising:

a flywheel (1) on a rear side of the engine, wherein an installing direction of a crankshaft defines a front and rear direction and a width direction of the engine defines a lateral direction;

a sideways exhaust treatment device (2) arranged on a rear upper side of the engine, having a one-side portion (4) and an other-side portion (50) and being positioned in the front and rear direction;

an engine exhaust outlet flange (3) arranged on one side of the engine, an exhaust inlet flange (5) arranged in the one-side portion (4), and the exhaust inlet flange (5) being attached to the engine exhaust outlet flange (3) by exhaust flange fastening tools (6);

a one-side support stay mount surface (8) and an other-side support stay mount surface (9) provided in an engine rear upper portion (7);

a one-side support stay (10) mounted on the one-side support stay mount surface (8) and attached by a one-side support stay fastening tool (11);

an other-side support stay (12) positioned in the front and rear direction, having a front portion (12a) thereof mounted on the other-side support stay mount surface (9) and attached by an other-side support stay fastening tool (13), such that the exhaust treatment device (2) is supported on the engine rear upper portion (7) via the one-side support stay (10) and the other-side support stay (12);

a cutout groove (20) in an end of the front portion (12a) of the other-side support stay (12), having an edge portion (21) and an opening (23), the other-side support stay fastening tool (13) being inserted into the cutout groove (20);

one-side support portions (14) provided in the one-side support stay (10);

other-side support portions (15) and an other-side support stay positioning piece (36) provided in the other-side support stay (12), the other-side support portions (15) having mating surfaces (24);

one-side supported portions (16) and other-side supported portions (17) provided in the exhaust treatment device (2), the other-side supported portions (17) having mating surfaces (25);

one-side temporary mount portions (22) located in the one-side support stay (10);

a gasket (3a); and an engine rear surface (32) and an other-side stay pressure receiving surface (34) provided in the engine rear surface (32);

wherein:

the one-side supported portions (16) of the exhaust treatment device (2) are attached to the one-side support portions (14) of the one-side support stay (10) via one-side supported portion fastening tools (18), and the other-side supported portions (17) of the exhaust treatment device (2) are attached to the other-side support portions (15) of the other-side support stay (12) via other-side supported portion fastening tools (19);

rotational moment of the other-side support stay (12) generated by a load of the other-side portion (50) of the exhaust treatment device (2) is received by the other-side support stay fastening tool (13) via the edge portion (21) of the cutout groove (20) if the other-side support stay fastening tool (13) is brought into the cutout groove (20) from the opening (23) while guiding the front portion (12a) of the other-side support stay (12) by the other-side support stay mount surface (9), such that the load of the other-side portion (50) of the exhaust treatment device (2) is supported by the other-side support stay (12);

the one-side portion (4) of the exhaust treatment device (2) and the one-side support stay (10) are temporarily mountable on the one-side temporary mount portions (22);

a lateral position of the other-side support stay (12) is adjustable via sideways advancement of the other-side support stay fastening tool (13) into the cutout groove (20) from the opening (23), upon mounting the front portion (12a) of the other-side support stay (12) onto the other-side support stay mount surface (9), the engine exhaust outlet flange (3) is attached to the exhaust inlet flange (5) via the exhaust flange fastening tools (6) with the gasket (3a) nipped therebetween, such that the engine exhaust outlet flange (3) faces the rear side and the exhaust inlet flange (5) faces the front side, the mating surfaces (24) (25) are oriented facing each other, such that the other-side support stay positioning piece (36) abuts the other-side stay pressure receiving surface (34) from the rear side, and the mating surfaces (24) of the other-side support portions (15) of the other-side support stay (12) are adapted to be overlapped with the mating surfaces (25) of the other-side supported portions (17) of the exhaust treatment device (2) from the side, for adjusting the lateral position of the other-side support stay (12), and the other-side supported portion fastening tools (19) are fastened while axes thereof are placed sideways.

13. The engine according to claim 12, wherein the engine further comprises a pair of front and rear other-side supported portion fastening tools (19), the other-side supported portions (17) include a fastening tool insertion hole (26), and the other-side support portions (15) include a fastening tool insertion hole (27);

wherein one of the fastening tool insertion hole (26) of the other-side supported portions (17) through which the front other-side supported portion fastening tool (19) is inserted and the fastening tool insertion hole (27) of the other-side support portions (15) is a front-rear long hole, the other hole is a circular hole, the holes being overlapped side by side, and the front other-side supported portion fastening tool (19) being placed at a position where the front-rear long hole and the circular hole are overlapped on the front side; and one of the fastening tool insertion hole (26) of the other-side supported portions (17) through which the rear other-side supported portion fastening tool (19) is inserted and the fastening tool insertion hole (27) of the other-side support portions (15) is a front-rear long hole, the other hole is an up-down long hole, the holes being crossed and overlapped side by side, and the rear other-side supported portion fastening tools (19) being placed at a position where the front-rear long hole and the up-down long hole are crossed on the rear side.

14. The engine according to claim 12, further comprising a fastening tool insertion hole (62) serving as a lateral long hole in a front portion (10a) of the one-side support stay (10);

wherein upon mounting the front portion (10a) of the one-side support stay (10) onto the one-side support stay mount surface (8);

the one-side support stay fastening tool (11) is inserted into the fastening tool insertion hole (62) serving as the lateral long hole, and the one-side support stay (10) is attachable to the one-side support stay mount surface (8) by the one-side support stay fastening tool (11) in such a manner that a lateral position is adjustable;

by providing a one-side stay pressure receiving surface (33) in the engine rear surface (32) and providing a one-side support stay positioning piece (35) in the front portion (10a) of the one-side support stay (10);

wherein the one-side support stay positioning piece (35) is abutted with the one-side stay pressure receiving surface (33) from the rear side, so that the one-side support stay (10) is positioned in the front and rear direction;

by respectively providing mating surfaces (28) in the one-side support portions (14) of the one-side support stay (10) and mating surfaces (29) in the one-side supported portions (16) of the exhaust treatment device (2) and directing both the mating surfaces (28)(29) to the side so as to face each other; for adjusting the lateral position of the one-side support stay (10), the mating surfaces (28) of the one-side support portions (14) being overlapped with the mating surfaces (29) of the one-side supported portions (16) of the exhaust treatment device (2) from the side; and the one-side supported portion fastening tools (18) being attached while axes thereof are placed sideways.

15. The engine according to claim 14, further comprising the pair of front and rear one-side supported portion fastening tools (18), wherein the one-side supported portions (16) include a fastening tool insertion hole (30) and the one-side support portions (14) include a fastening tool insertion hole (31), one of the fastening tool insertion hole (30) of the one-side supported portions (16) through which the front one-side supported portion fastening tool (18) is inserted and the fastening tool insertion hole (31) of the one-side supported portions (14) being a front-rear long hole and the other of the fastening tool insertion holes (30, 31) being an up-down long hole, the holes (30, 31) being crossed and overlapped side by side, the front one-side supported portion fastening tool (18) being placed at a position where the front-rear long hole and the up-down long hole are crossed on the front side, and one of the fastening tool insertion hole (30) of the one-side supported portions (16) through which the rear one-side supported portion fastening tool (18) is inserted and the fastening tool insertion hole (31) of the one-side supported portions (14) being a front-rear long hole and the other of the fastening tool insertion holes (30, 31) being an up-down long hole, the holes (30, 31) being crossed and overlapped side by side, the rear one-side supported portion fastening tool (18) being placed at a position where the front-rear long hole and the up-down long hole are crossed on the rear side.

16. The engine according to claim 14, wherein a part of the rotational moment of the other-side support stay (12) generated by the load of the other-side portion (50) of the exhaust treatment device (2) is received by the other-side stay pressure receiving surface (34) of the engine rear surface (32) via the other-side support stay positioning piece (36), and a part of rotational moment of the one-side support stay (10) generated by a load of the one-side portion (4) of the exhaust treatment device (2) is received by the one-side stay pressure receiving surface (33) of the engine rear surface (32) via the one-side support stay positioning piece (35).

* * * * *